US008234770B2

(12) United States Patent
Durandet et al.

(10) Patent No.: US 8,234,770 B2
(45) Date of Patent: Aug. 7, 2012

(54) METHOD AND APPARATUS FOR JOINING METALS USING SELF-PIERCING RIVETS WITH PREHEATING

(75) Inventors: Yvonne Claire Durandet, Balwyn North (AU); Wei Qian Song, Camberwell (AU); Brian Dempster, Glen Iris (AU); Milan Brandt, Templestowe (AU); Stuart Blacket, Closebum (AU)

(73) Assignee: Cast CRC Limited, St. Lucia (AU)

( * ) Notice: Subject to any disclaimer, the term of this patent is extended or adjusted under 35 U.S.C. 154(b) by 654 days.

(21) Appl. No.: 12/302,702

(22) PCT Filed: May 31, 2007

(86) PCT No.: PCT/AU2007/000769
§ 371 (c)(1),
(2), (4) Date: Feb. 13, 2009

(87) PCT Pub. No.: WO2007/137367
PCT Pub. Date: Dec. 6, 2007

(65) Prior Publication Data
US 2009/0188101 A1    Jul. 30, 2009

(30) Foreign Application Priority Data
May 31, 2006    (AU) ................................ 2006902942

(51) Int. Cl.
B23P 11/00    (2006.01)
B29C 65/16    (2006.01)
(52) U.S. Cl. ....................................... 29/525.01; 159/91

(58) Field of Classification Search ................ 29/525.01, 29/33 K, 432.1, 432, 509, 525.13, 525.14, 29/798, 243.53; 159/91; 219/121.85
See application file for complete search history.

(56) References Cited

U.S. PATENT DOCUMENTS

| 4,237,363 | A | * | 12/1980 | Lemelson ................ 219/121.85 |
| 6,417,490 | B1 | | 7/2002 | Liebrecht |
| 6,836,948 | B2 | * | 1/2005 | Wang ........................... 29/432.1 |
| 2002/0125297 | A1 | | 9/2002 | Stol et al. |
| 2004/0134968 | A1 | | 7/2004 | Opper |
| 2004/0148760 | A1 | | 8/2004 | Wang |
| 2005/0133483 | A1 | | 6/2005 | Hou |

FOREIGN PATENT DOCUMENTS

| DE | 19630488 | * | 1/1998 |
| JP | 62-105736 U | | 7/1987 |
| JP | 62-179882 | | 8/1987 |
| JP | 08-318339 | | 4/1995 |
| JP | 2000-511470 | | 12/1998 |
| JP | 2005-342739 | | 12/2005 |
| JP | 2006-007266 | | 1/2006 |
| JP | 2006043769 | | 2/2006 |

OTHER PUBLICATIONS

Wang, Jiajin, "Laser Processing Technology", China Metrology Publishing House, Nov. 1992, ISBN 7-5026-0556-8/TN.9. (English translation included).

* cited by examiner

*Primary Examiner* — John C Hong
(74) *Attorney, Agent, or Firm* — Rodman & Rodman

(57) ABSTRACT

A method for joining elements together, the method comprising the steps of: positioning the elements relative to one another; enhancing the formability of at least a portion of at least one of the elements using a laser; and joining the elements together using a mechanical fastening method.

35 Claims, 17 Drawing Sheets

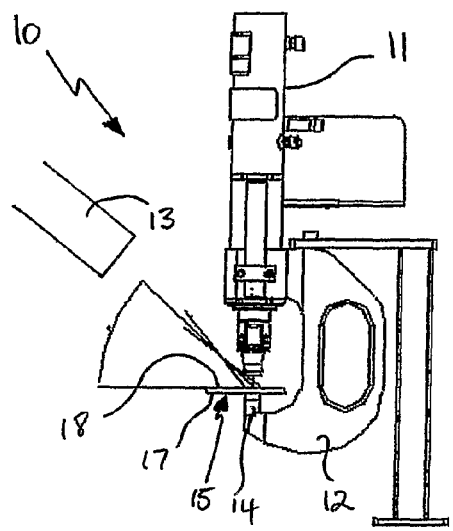
(A)
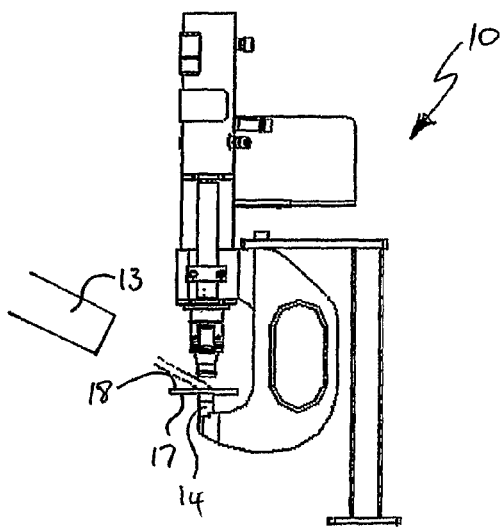
(B)
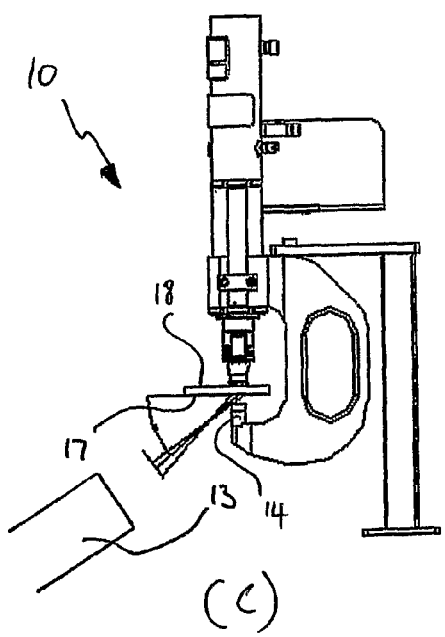
(C)
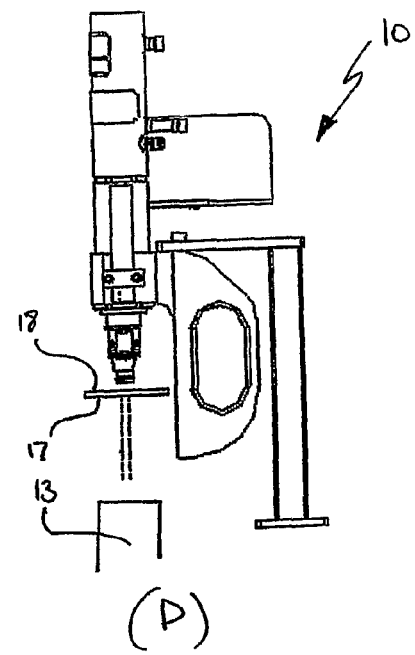
(D)
Figure 1

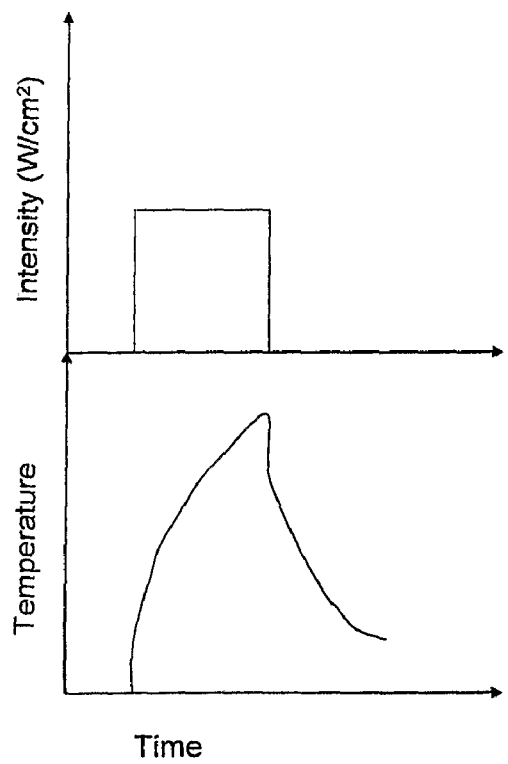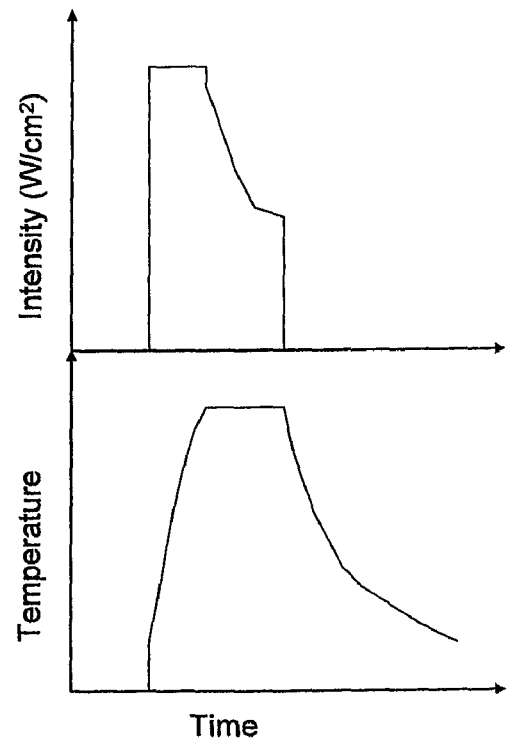
Constant Energy Input
Time-Dependent Energy Input
Figure 2E

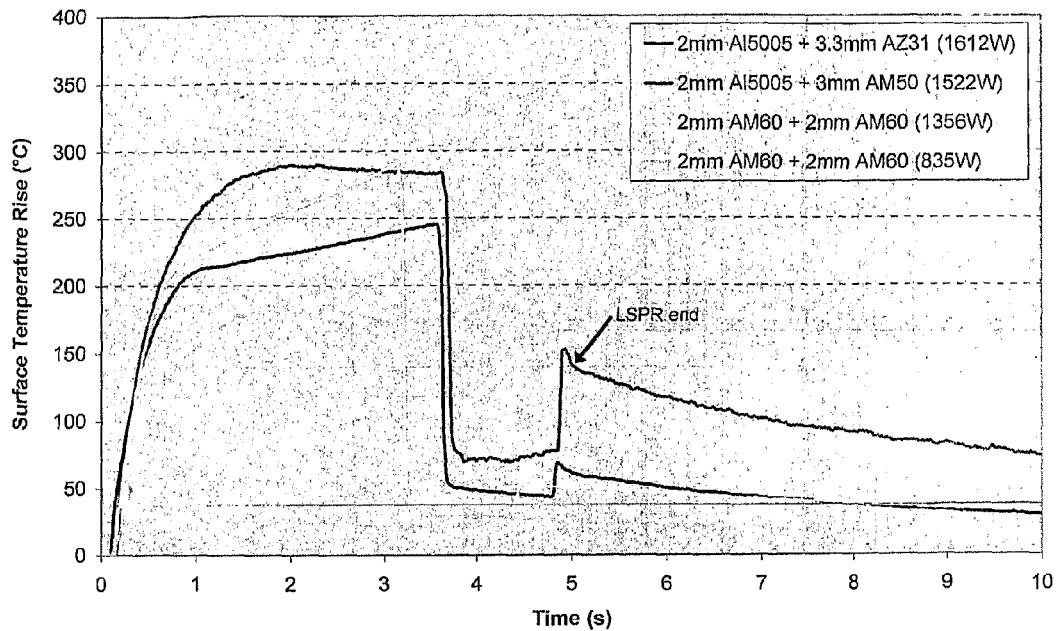
Fig. 3A
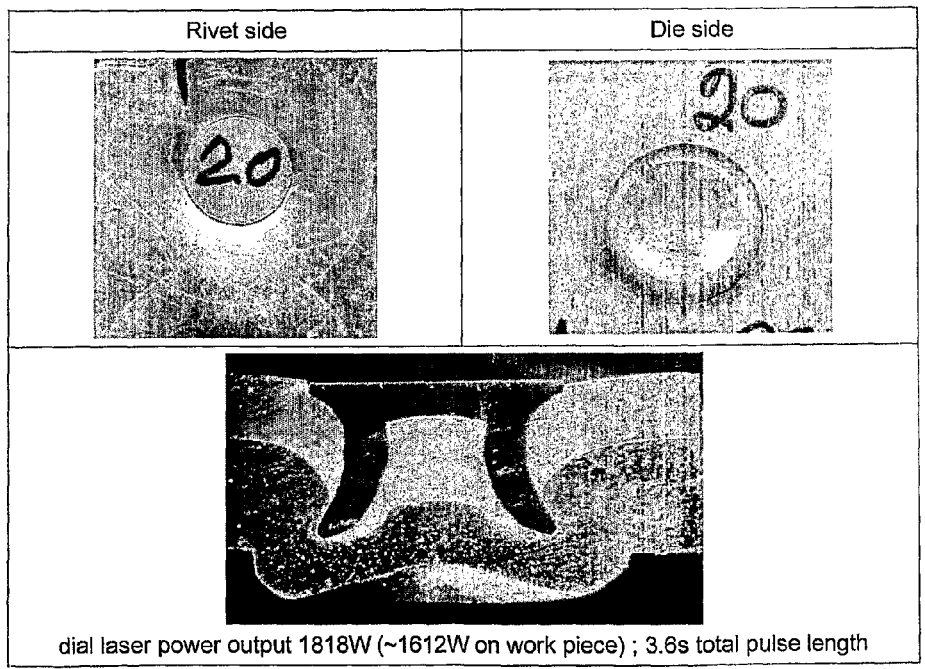
Fig. 3B : 2mm Al 5005H34 + 3.3mm strip cast AZ31-O (as-received). Joint produced using cone die profile Ø 11mm x 1.8mm depth and 6.5mm - L1 rivet with Al coating (LSPR4-20 )

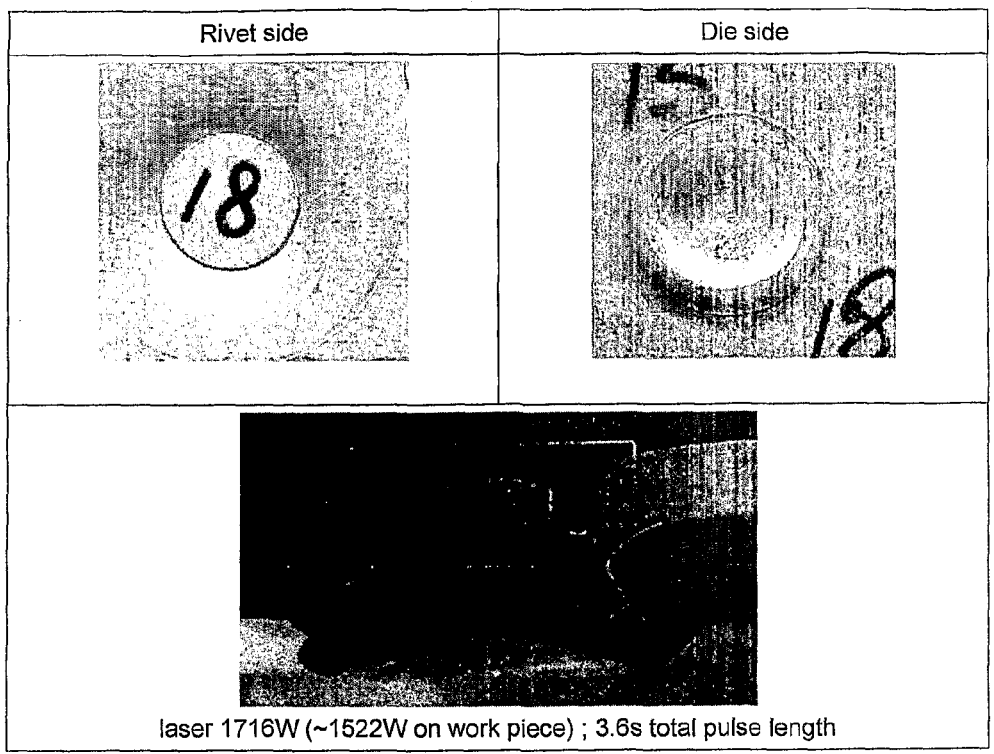
Fig. 3C : 2mm Al 5005H34 + 3mm HPDC AM50 (garnet shot blast). Joint produced using cone die profile Ø 11mm x 1.8mm depth and 6.5mm - L1 rivet with Al coating (LSPR4-18)
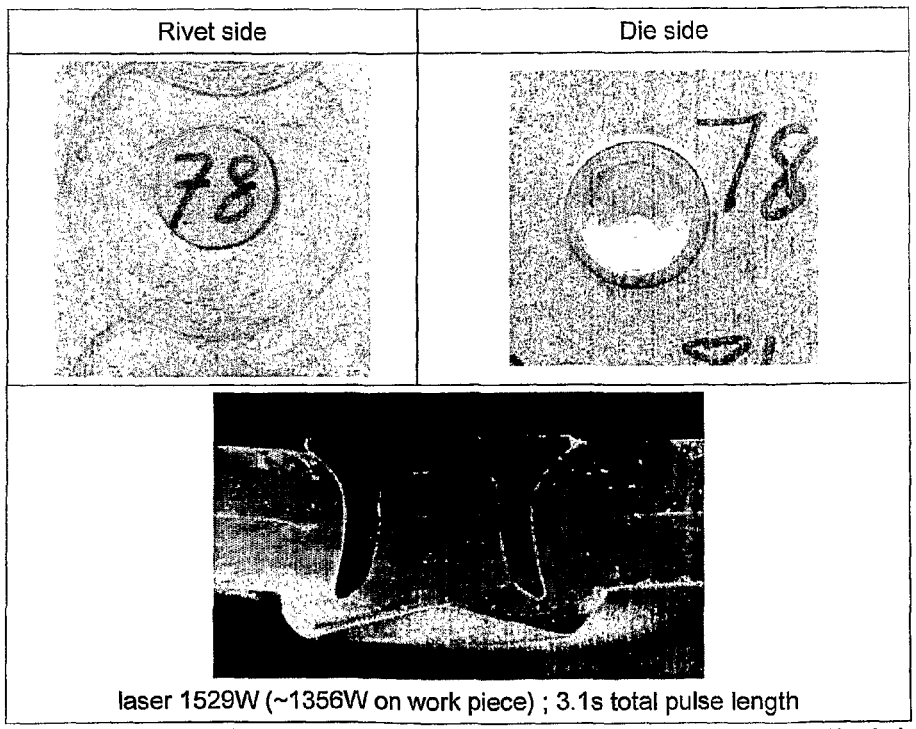
Fig. 3D : as-cast 2mm HPDC AM60 + garnet shot blast 2mm HPDC AM60. Joint produced using cone die profile Ø 9mm x 1.9mm depth and 5mm – L2 rivet with Zn/Sn coating (LSPR4-78)

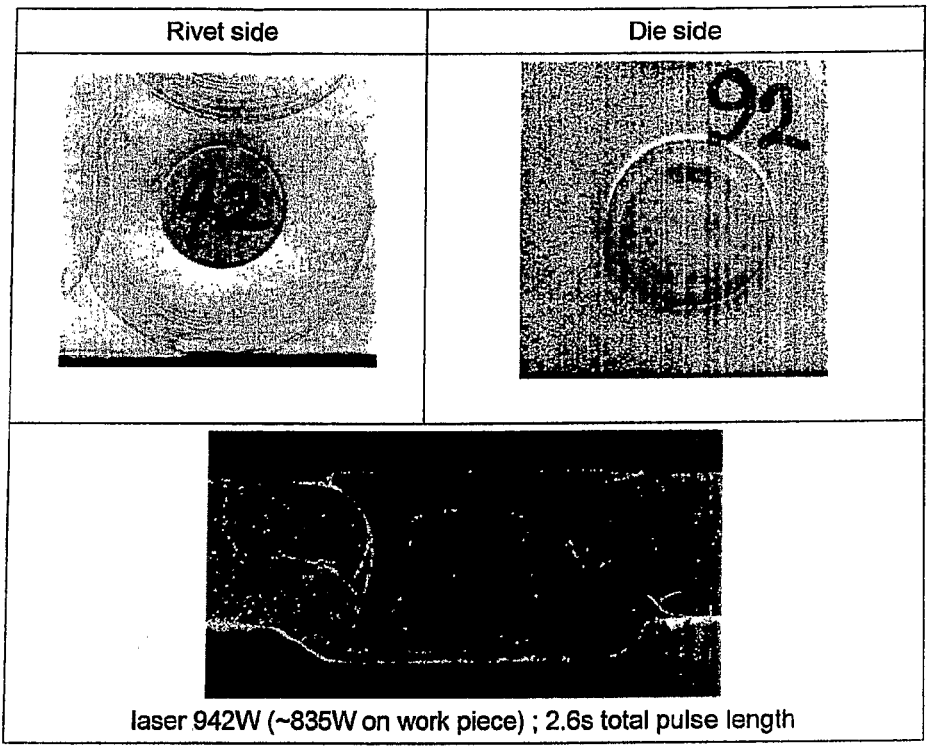
Fig. 3E : as-cast 2mm HPDC AM60 + garnet shot blast 2mm HPDC AM60. Joint produced using flat die profile Ø 10mm x 1mm depth and 5mm – L2 rivet with Zn/Sn coating (LSPR4-92)
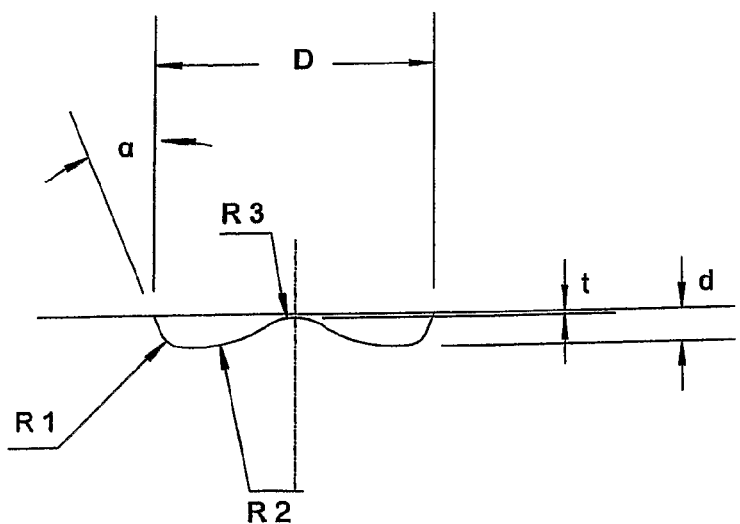
Figure 4

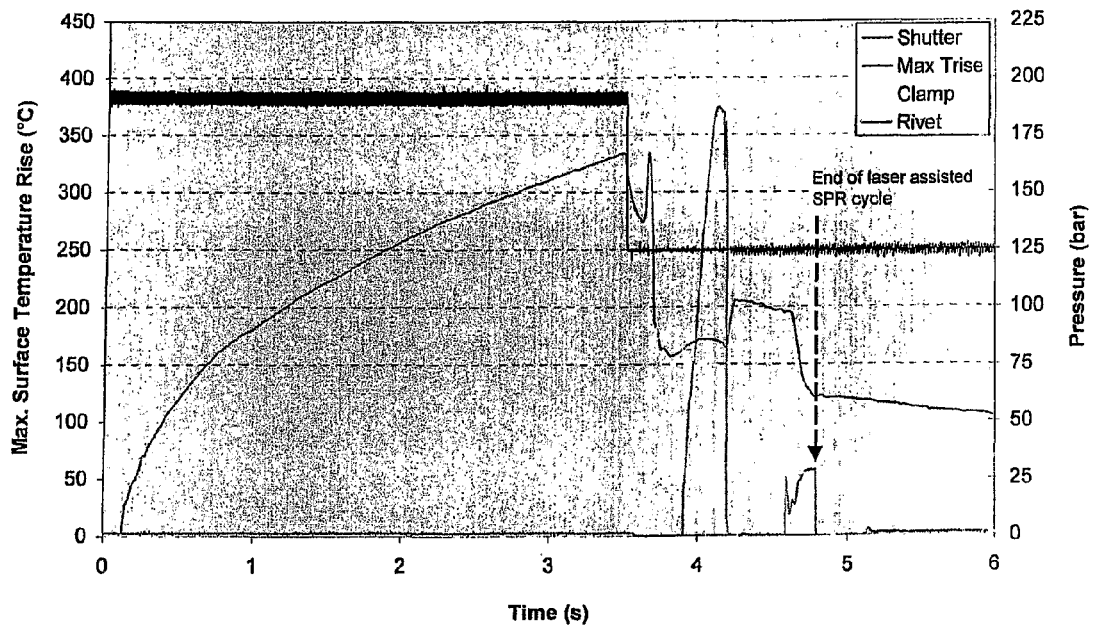
Fig. 5A (Data from run No. LSPR7-29. Joining of 3.3mm+3.3mm AZ31 with 8mm-L3 rivet and cone die profile BD2; 1758W laser power on work piece, 3.51s preset dwell time)

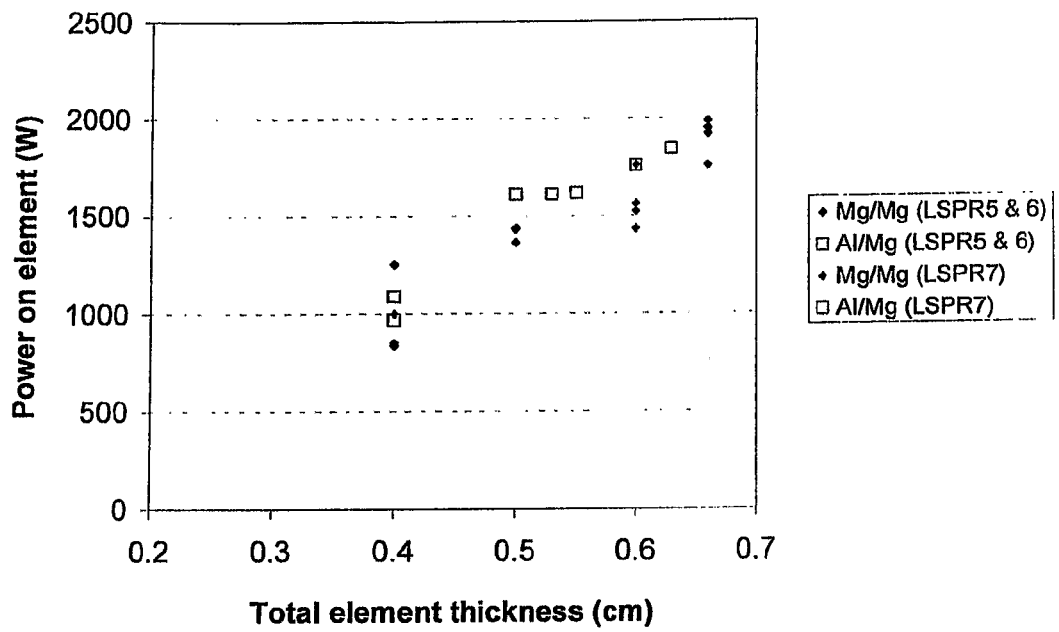
Fig. 5B : Power on work piece as a function of total element thickness
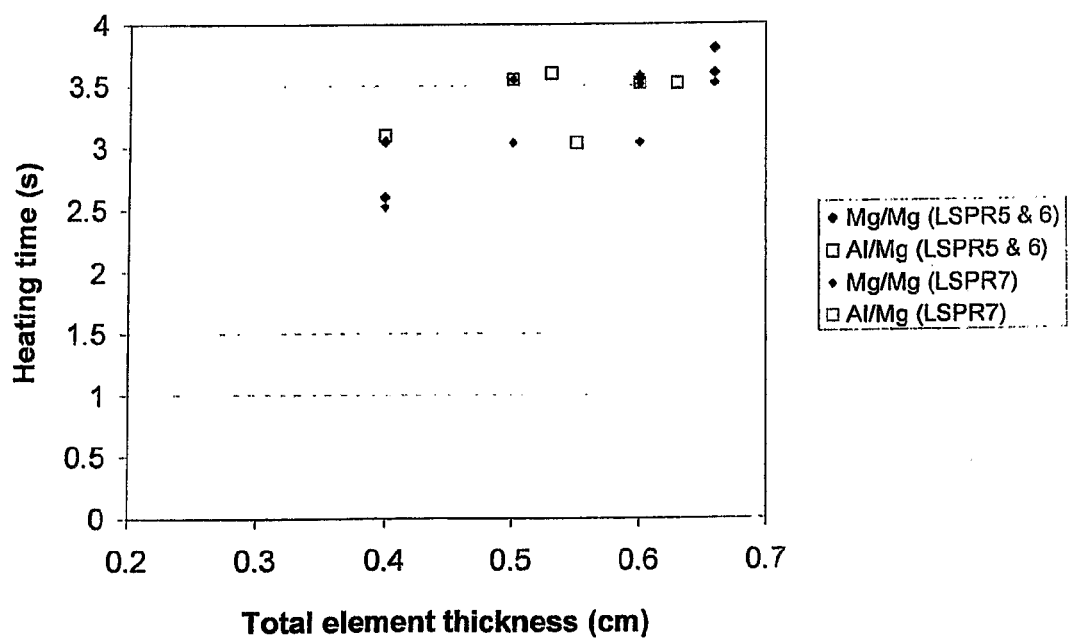
Fig. 5C : Laser preset dwell times used for the various combinations of elements

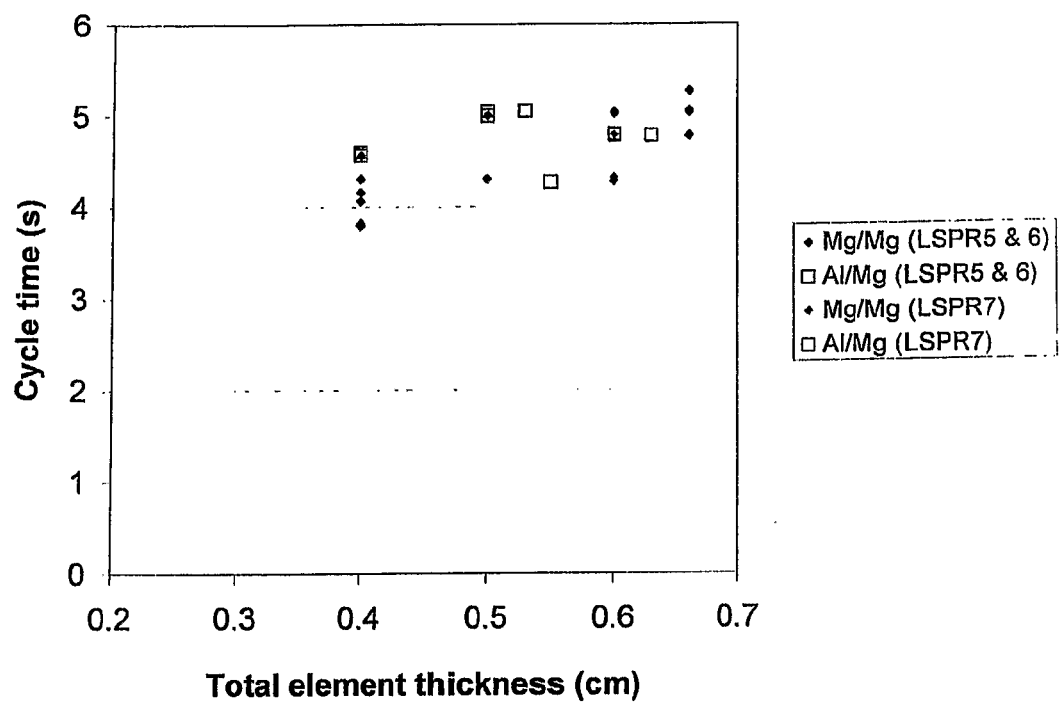
Fig. 6 : Cycle times achieved to heat and join various combinations of elements

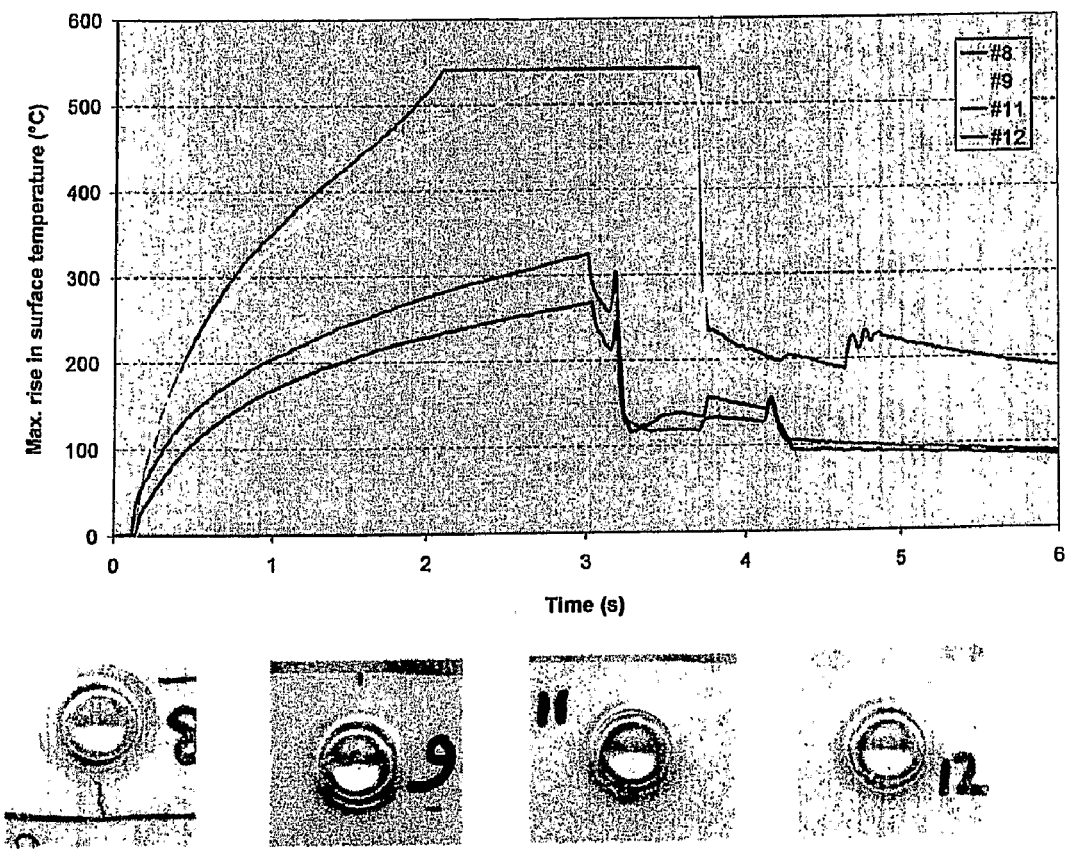
Fig. 7. Temperature and die side surface appearance of various 3mm+3mm HPDC AM50 joints produced with 8mm-L3 rivet and BD2 cone die profile Ø 11mm x 1.2mm depth

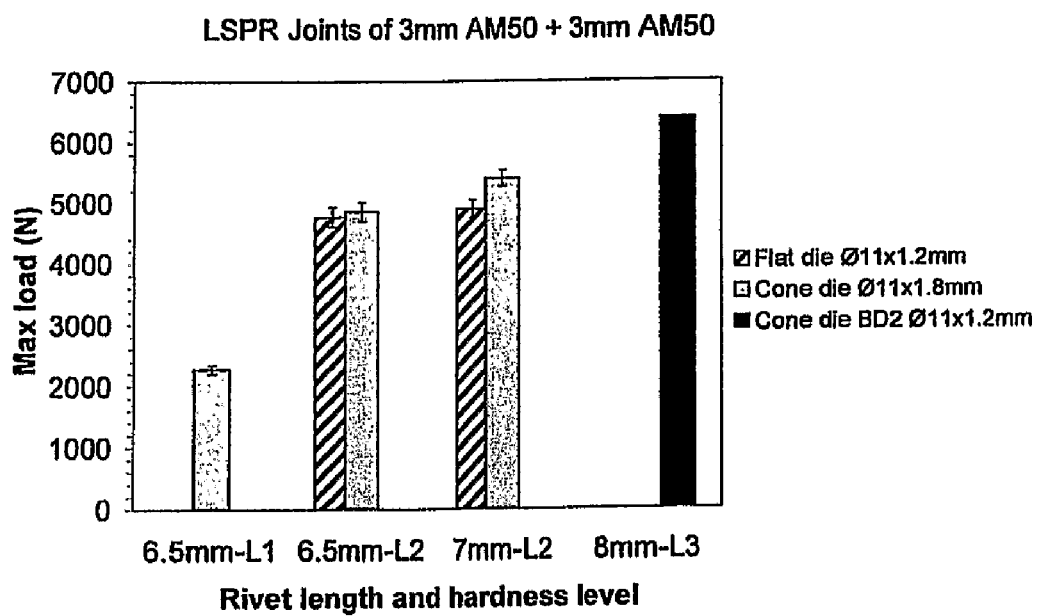
Fig. 8A : Effects of die and rivet on strength of 3mm+3mm HPDC AM50 joints (tensile testing at 0.6mm/min)

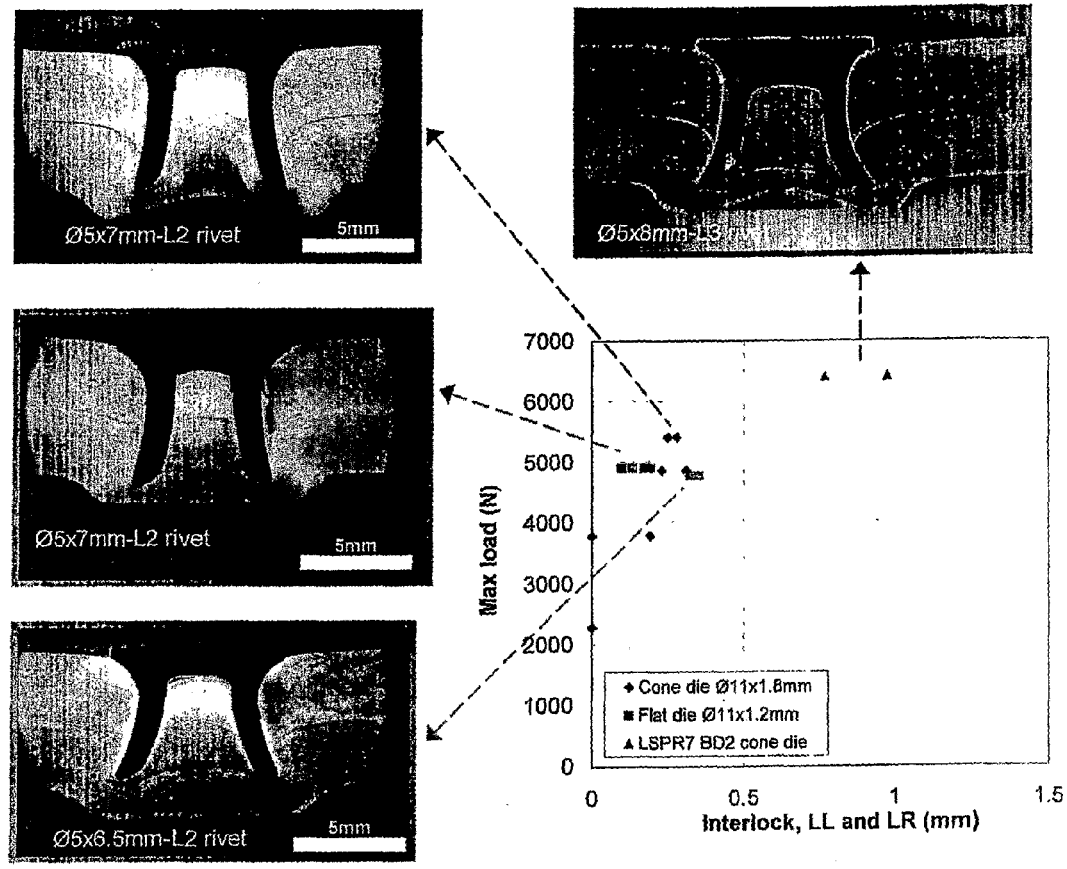
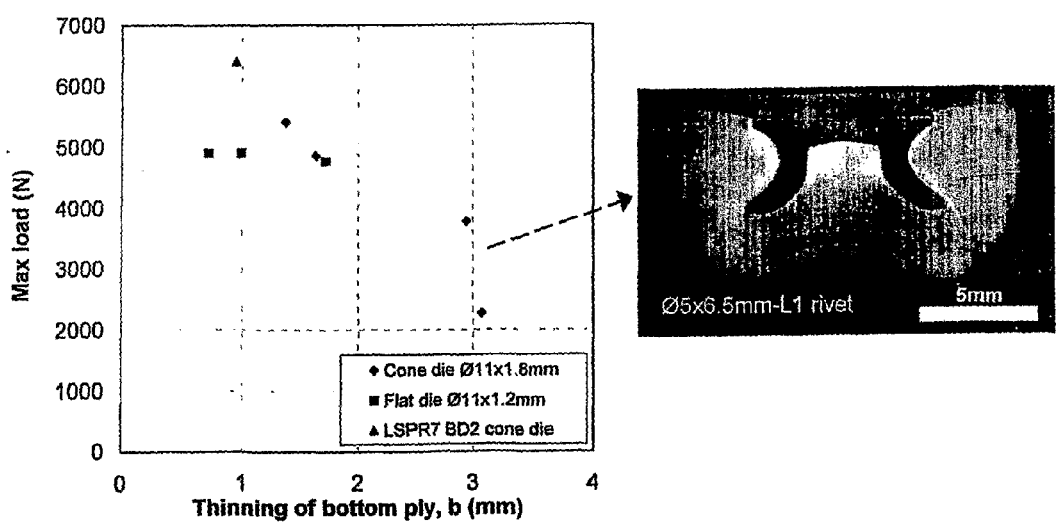
Figure 8B : Related effects of die/rivet and joints characteristics on the maximum load of joints of 3mm+3mm HPDC AM50

Temperature of 3.3mm+3.3mm AZ31 joints produced with 8mm-L3 rivet and BD2 cone die profile Ø 11mm x 1.2mm depth Comparison of the strength of thick Mg/Mg and hybrid Al/Mg joints (tensile testing at 100mm/min). Note that the Al/Al joints were produced without laser assist.

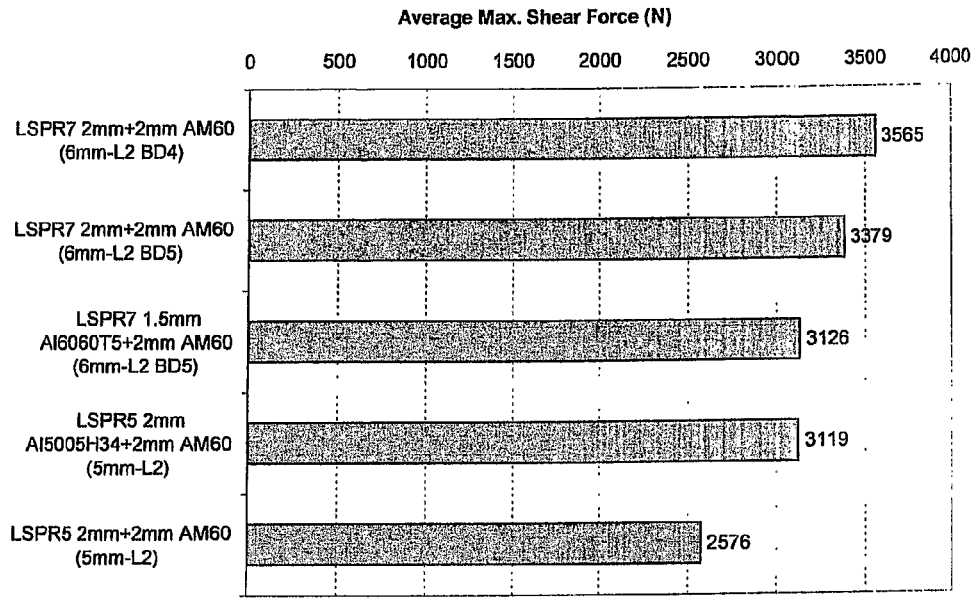
Fig 10A : Mg/Mg and hybrid Al/Mg joints of 3.5 to 4mm total thickness (small test pieces)
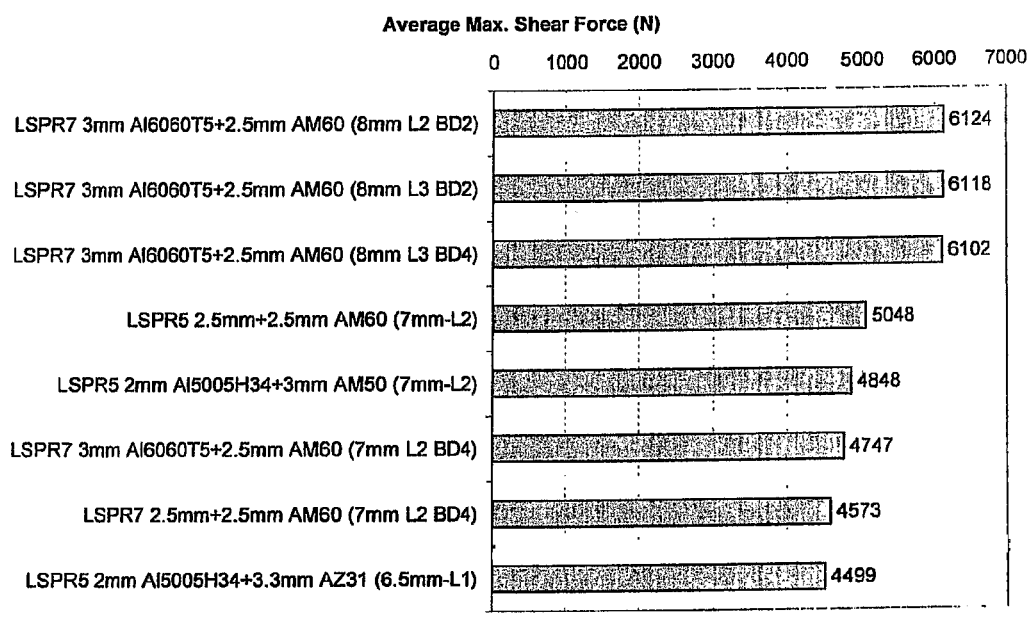
Fig. 10B : Mg/Mg and hybrid Al/Mg joints of 5 to 5.5mm total thickness (large test pieces)

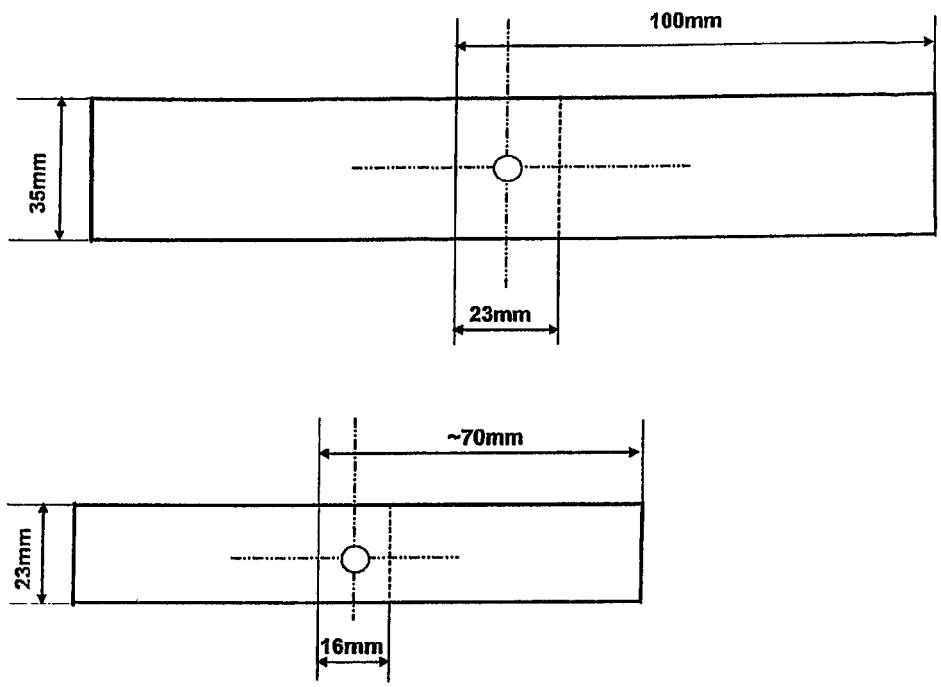
Fig. 10C : Dimensions of large and small test pieces used for static lap shear testing

METHOD AND APPARATUS FOR JOINING METALS USING SELF-PIERCING RIVETS WITH PREHEATING

FIELD OF THE INVENTION

The present invention relates to a method for joining elements together, in particular metal elements. The present invention also relates to an apparatus for joining elements together.

BACKGROUND OF THE INVENTION

Forming joins between sheets of metal which are both strong and of sufficient aesthetic appeal is an ongoing issue for many industries, in particular the automotive industry. One area of joining where significant problems remain is when making a join between sheets of two different metals.

One technique which is widely used in joining sheets of metal in high volume production is spot welding or butt welding, which may or may not involve the use of a laser. Laser welding is particularly suitable for joining sheets of different thicknesses and results in neat and narrow joins, produced at high speed. However, a number of problems exist in laser welding. One such problem is that when using such a technique to join magnesium to aluminium alloys (as with any technique which involves at least some melting), the laser welding results in the formation of hard and brittle inter-metallic phases around the weld. Furthermore, such techniques are not particularly suitable to magnesium alloys formed by a high pressure die casting process because of the trapped gases in such castings.

This problem is not specific to magnesium when using laser welding. In the case of steel, for example, the formation of hard phases such as martensite about the laser welded join impairs the ductility of the stainless or non-stainless steel. In the case of joins between aluminium/steel elements, intermetallic Fe—Al phases grow to form a layer at the interface. To produce Fe—Al joints of acceptable mechanical properties, the thickness of this inter-metallic layer must be less than 10 μm and therefore requires appropriate temperature-time cycles.

When laser welding, at least one of the components is melted. Laser welding of aluminium to steel is like a brazing process, where only the lower melting point alloy undergoes fusion. On the other hand, laser welding of magnesium and aluminium leads to the melting of both metals so that the inter-diffusion of chemical elements cannot be prevented. This results in the formation of inter-metallic phases such as for example $\beta$-$Mg_{17}(Al, Zn)_{12}$, which has to be minimised in order to form a satisfactory join.

An alternative technique for forming a join is friction stir welding (FSW) which is more tolerant to dissimilar metals being joined and to high pressure die castings (which have trapped gases) because it is a solid state joining process, whereby two materials are plasticised under the action of a probe. Thus, the metals are not melted when friction stir welded. A number of problems, however, exist with friction stir welding, including the low speed of the process, the limited part geometry to which the process can be applied and the high force requirements, which may require a high amount of power and special tooling for friction and clamping. Furthermore, evidence exists to suggest that when using friction stir welding to join magnesium to aluminium, $Al_3Mg_2$ and $Al_{12}Mg_{17}$ phases are formed about the weld which may crack under stress.

As an alternative to the above methods, cold joining technologies may be employed to join dissimilar metals without the formation of undesirable metallurgical compounds and to avoid the issues relating to trapped gases in high pressure die castings. One such technique is bolting, which has a number of its own problems, including the added weight, the requirement for accurate alignment, fretting and wear between the bolt and the metal part (particularly where the metal is magnesium or magnesium alloy), and increased material costs in providing the bolts.

An alternative cold joining technique is that of self-piercing riveting (SPR) which is particularly suitable for joining dissimilar metals which are reasonably formable. An advantage of self-piercing riveting is that galvanic corrosion can be minimised. However, when joining aluminium and magnesium alloys using an SPR process for example, a significant problem arises when the magnesium is on the bottom (die) side of the join, where the high tensile strains deforming the magnesium, tend to cause the magnesium to crack because of its poor ductility at room temperature.

Attempts have been made to overcome this problem by preheating the magnesium. An example of this is described in DE 19630488 in which induction heating is used to preheat the magnesium in forming the SPR joint. However, a number of problems exist with this process, including high power requirements, long cycle times and difficulties inherent with the tooling, which is bulky and difficult to accommodate. These problems reduce the economic viability of the technique.

SUMMARY OF THE INVENTION

According to a first aspect of the present invention there is provided a method for joining elements together, the method comprising the steps of:

positioning the elements relative to one another;

enhancing the formability of at least a portion of at least one of the elements using a laser; and joining the elements together using a mechanical fastening method.

It is understood that enhancing the formability of at least a portion of at least one of the elements may involve enhancing any one or more of the physical properties of the portion, such as the ductility, workability, plasticity, flow (hardening) behaviour, yield surface or anistropy for example.

In an embodiment, the mechanical fastening method is carried out approximate to the portion of at least one of the elements, preferably at the portion of at least one of the elements.

The mechanical fastening method may be any suitable method.

In an embodiment, the mechanical fastening method comprises using a mechanical fastener.

However, in other embodiments, the mechanical fastening method is a clinching-type process or a press joining process.

The elements are not limited to any particular articles, but may be any articles that require joining.

Although in particular applications the elements may be sheets of material some or all of the elements may not be sheets of material, but may be studs, framework, bars or other structural members for example.

In an embodiment, the laser produces a laser beam which is incident on the portion.

The laser beam may be incident on either side of the at least one element, preferably the side opposite to the side on which a mechanical tool acts on the elements to carry out the mechanical fastening method, ie. on the die side.

The laser beam generally enhances the formability of the portion by heating the portion.

The step of enhancing the formability of the portion may or may not occur prior to the step of positioning the elements relative to one another.

The method may comprise enhancing the formability of portions of some or all of the elements using the laser.

In another embodiment, the formability of only a portion of one of the elements is enhanced.

In an embodiment, if the formability of a portion of only one of the elements is to be enhanced in formability then the element enhanced in formability is that which is of a material that is least formable at room temperature or the element which will be subjected to the greater strain during the step of joining them together using the mechanical fastening method.

The laser may be a pulsed or interrupted laser of suitable duration, energy and frequency.

In another embodiment, the laser is a continuous laser, which produces a constant beam. The continuous laser may be converted into a pulsed or interrupted laser by any suitable mechanical, electrical or other-type apparatus.

In an embodiment, the size, shape and energy distribution of the portion enhanced in formability using the laser can be varied and hence optimised by varying one or more of the laser power, the laser spot size, the laser pulse length or frequency.

In an embodiment, the shape of the laser beam may be a disc or a ring (anulus) shape. The shape of the laser beam may also be used to modify the temperature distribution at the surface of, or temperature gradient in the portion so that higher temperatures may be obtained where higher mechanical strains are to be applied.

Typically, a more powerful laser will raise the temperature of the element(s) higher over a shorter period of time.

In an embodiment, the laser power output is between 100 Watts to 5000 Watts, preferably 100 to 2500 Watts, in particular for enhancing the formability of a magnesium element. This laser power output is particularly suitable for elements having a total thickness of less than 15 mm, preferably less than 10 mm, preferably less than 7 mm, more preferably less than 6.6 mm.

The laser power output required or the time taken to suitably enhance the formability of the elements may be higher because of, amongst other factors, the number of elements being joined together, the total thickness of the elements, the alloy, the size of the elements and the distance of the portion from the edge of the element. The laser power output required is also dependent on the number of portions being enhanced in formability by the laser at the same time. The aforementioned power requirements can generally be considered to be the power requirement per portion being enhanced (ie. for a single portion).

In an embodiment, the time taken to suitably enhance the formability of the element is less than 3.5 seconds. This may be referred to as the "laser dwell time".

In an embodiment, the time taken to suitably enhance the formability and join the elements together using the mechanical fastening method is less than 10 seconds, preferably, less than 5 seconds. This time may be referred to as the "total cycle time". It is noted that this time does not include the time taken to position the elements relative to one another.

The formability of the element may be suitably enhanced by raising the temperature of the portion up to 80% of the melting point (solidus) of the element. This temperature may be 100-350° C. for a magnesium alloy depending on the alloy type and heat treatment, as well as the element temperature as against the level and distribution and rate of deformation required.

In an embodiment, the method further comprises the step of reflecting the laser beam onto at least one of the elements using a laser optical apparatus.

In an embodiment, the laser optical apparatus comprises optic heads and/or mirrors.

In an embodiment, the size, shape and temperature distribution of the portion enhanced in formability using the laser can be varied and hence optimised by varying the components of the laser optical apparatus.

Typically, a more focused laser beam which is incident on a smaller portion of at least one of the elements raises the temperature of the element(s) higher over a shorter period of time.

The laser may be a diode laser, a Nd:YAG laser, or a CO2 laser or may be any other suitable laser.

In an embodiment, the method also comprises the step of preparing the surface of the portion of the element(s) to enhance the absorption of the laser energy.

In one embodiment, the step of preparing the surface comprises cleaning the surface by sand blasting or pickling, rinsing and drying for example.

In another embodiment, the step of preparing the surface comprises roughening the surface by glass bead blasting for example.

In another embodiment, the step of preparing the surface comprises applying a light absorptive coating to the surface.

The absorptive coating may be a coating of graphite, black carbon, Aero 504 (Japan Acheson Corporation) or any other suitable absorber.

In one embodiment, the absorptive coating may be a coating which also functions as a corrosion preventive coating. An example of such a coating is e-coating.

In an embodiment, the method also comprises the step of applying an adhesive material between at least two of the elements to be joined, prior to the step of enhancing the formability.

In this embodiment, upon enhancing the formability of the portion of at least one of the elements using the laser, the adhesive material is heated, which cures and/or hardens the adhesive material.

In an embodiment, the adhesive material provides an additional bond for the join between the elements.

In an embodiment, the mechanical fastening method comprises using a mechanical fastening tool to act on the elements.

In an embodiment, the mechanical fastening tool acts on the elements by acting on a mechanical fastener.

In an embodiment, the mechanical fastener joins the elements together into and/or through the portion of at least one of the elements.

In an embodiment, the mechanical fastener deforms the elements.

In an embodiment, the mechanical fastener is a self-piercing rivet. The self-piercing rivet may be a solid or semi-hollow rivet.

In other embodiments, the mechanical fastener is a bolt, nut, screw or stud for example.

In an embodiment, the step of joining the elements together is a self-piercing riveting process, in which the self-piercing rivet is acted upon by a mechanical fastening tool in the form of a rivet gun to drive the rivet into and/or through the elements. In this embodiment, the mechanical tool may also comprise a die.

In a further embodiment, the mechanical fastener is a plastic rivet.

In another embodiment, the mechanical fastening method comprises deforming a part of the elements using a mechanical tool.

In this embodiment, deforming the part of the elements with the mechanical tool forms the part of the elements into a mechanical fastener.

The mechanical fastener in this embodiment is an interlocking deformation of the elements.

The mechanical tool in this embodiment comprises a punch. The mechanical tool may also comprise a die.

In this embodiment, the step of joining may be a clinching type process, in which the mechanical tool is in the form of a punch and die, and wherein the step of joining comprises deforming a part of the elements into the die, to form the mechanical fastener which joins the elements together.

In another embodiment, the mechanical fastening method is a press-joining process, such as dieless clinching or dieless rivet clinching.

The method may further comprise the step of heating the mechanical fastener prior to the step of joining the elements together.

In an embodiment, the mechanical fastener is heated using the laser.

The laser beam may be arranged co-axially with the mechanical fastener in order to preheat the mechanical fastener.

The laser operates before the step of joining the elements together and may also operate during the step of the joining the elements together.

In another embodiment, the laser beam is arranged non-axially with the mechanical fastener.

The method may further comprise the step of heating the mechanical fastening tool prior to the step of joining the elements together.

In an embodiment, the mechanical fastening tool is heated using the laser.

The laser beam may be arranged co-axially with the mechanical fastening tool in order to preheat the mechanical fastening tool.

In another embodiment, the laser beam is arranged non-axially with the mechanical fastening tool.

In an embodiment, the method also comprises the step of heating the die of the mechanical tool.

In an embodiment, the step of positioning the elements relative to one another comprises placing the elements on top of one another.

In an embodiment, the method further comprises the step of clamping the elements in their position relative to one another.

In an embodiment, the step of clamping comprises applying a substantial compressive force to the elements.

In an embodiment, the step of clamping occurs prior to the step of joining the elements together using a mechanical fastening method.

In an embodiment, the step of clamping occurs simultaneously with the step of joining the elements together using a mechanical fastening method.

In an embodiment, the step of clamping occurs after the step of joining the elements together using a mechanical fastening method.

In an embodiment, the step of clamping occurs in any combination of prior to, simultaneously with or after the step of joining the elements together using the mechanical fastening method.

In an embodiment, the method further comprises repeating the step of joining the elements together at a plurality of discrete locations along a join line.

In an embodiment, the method further comprises repeating the step of enhancing the formability of a plurality of discrete portions of at least one of the elements.

In an embodiment, the plurality of discrete portions define the plurality of discrete locations along the join line at which the elements are joined together.

In another embodiment, the method comprises enhancing the formability of a broad area of at least one of the elements using the laser(s), the broad area encompassing more than one discrete location at which the elements are joined together.

In an embodiment, a single laser is used to enhance the formability of the plurality of portions.

In an embodiment, the method further comprises simultaneously enhancing the formability of some or all of the plurality of portions.

In an embodiment, the method further comprises splitting a single laser beam to enhance the formability of a plurality of portions of at least one of the elements. In this embodiment, the laser may need higher power output than 5000 Watts, depending on the number of splits of the beam. Therefore, in an embodiment, the laser power output is 100-5000 W per laser beam split, preferably 100-2500 W per laser beam split.

In another embodiment, a number of lasers are used to enhance the formability of some or all of the portions simultaneously.

In another embodiment, the method further comprises using a single laser to enhance the formability of the plurality of portions one at a time.

According to a second aspect of the present invention, there is provided an apparatus for joining elements together, the apparatus comprising a laser beam generating device for providing a laser beam incident on at least a portion of at least one of the elements, and a mechanical fastening tool for acting on a mechanical fastener to join the elements together.

In an embodiment, the laser generating device is a diode, Nd:YAG laser generating device, or a CO2 laser generating device or any other suitable laser generating device.

In an embodiment, the mechanical fastening tool comprises a rivet gun for acting on a mechanical fastener.

The mechanical tool may also comprise a die.

The rivet gun and die may be any suitable rivet gun and die, such as those disclosed in U.S. Pat. Nos. 5,752,305 and 6,742,235 which are incorporated herein by way of reference.

In another embodiment, the mechanical tool comprises a punch for deforming a part of the elements into an interlocking deformation of the elements.

In this embodiment, the mechanical tool may also comprise a die.

In an embodiment, the die comprises an indentation which is flat in profile.

In another embodiment, the die comprises an indentation which is shaped to encourage flow of the elements being joined away from the centre of the die.

In an embodiment, the die is semi-toroidal in shape.

In an embodiment, the die comprises an indentation which is cone-shaped in profile.

In an embodiment, the cone-shaped die comprises a raised central portion of the indentation. The raised central portion may be curved or straight-edged (ie. triangular).

In an embodiment, the die is a flat plate, ie. having no indentation.

In an embodiment, the die has a non-stick coating.

In another embodiment, the die has a heat resistant coating.

In an embodiment, the die has an oxidation-resistant coating.

In an embodiment, the apparatus also comprises a clamping tool for clamping the elements in their position relative to one another.

BRIEF DESCRIPTION OF THE DRAWINGS

Preferred embodiments of the present invention, will now be described, by way of example only, with reference to the accompanying drawings, in which:

FIGS. 1A, 1B, 1C and 1D show side views of alternative arrangements of an apparatus for joining elements together according to the present invention, primarily for trial purposes;

FIG. 2E is a comparison of the temperature of the element surface temperature over time for a constant energy input as against a time-dependent energy input;

FIG. 3A is a graph showing the temperature of elements of varying thicknesses during joining to other elements using a method according to embodiments of the present invention, the internal and external appearance of the joints are shown in FIGS. 3B to 3E;

FIG. 4 is a schematic view of the die profile of an apparatus for joining elements together according to embodiments of the present invention;

FIG. 5A is a graph of maximum surface temperature, clamping and rivet setting pressures during a method for joining according to embodiments of the present invention;

FIGS. 5B and 5C are graphs of the laser power on element against the total element thickness and the laser heating time against the total element thickness, respectively, showing data points for crack-free joints formed in Example 2;

FIG. 6 is a graph of the total time taken to join elements (excluding positioning of the elements relative to one another) against the total element thickness;

FIG. 7 illustrates the effects of temperature of a 3 mm thick element of high pressure die cast AM50 alloy element during joining to another same element using a method according to embodiments of the present invention, the effects of temperature on the external appearance of the joints are shown in FIG. 7A, FIG. 7B is a graph of the maximum load of elements joined together for different maximum surface temperatures;

FIGS. 8A to D are graphs pertaining to Example 3 in which the effects of changing the die and rivet were studied;

FIGS. 10A to C are graphs of the maximum load of various elements joined together using the joining method according to embodiments of the present invention, FIGS. 10A, 10B and 10C are for total element thicknesses of 3.5-4 mm, 5-5.5 mm and 6-6.6 mm respectively, FIG. 10D is a schematic of the size of the join specimens used for mechanical testing.

DETAILED DESCRIPTION OF PREFERRED EMBODIMENTS

Figure 2A:
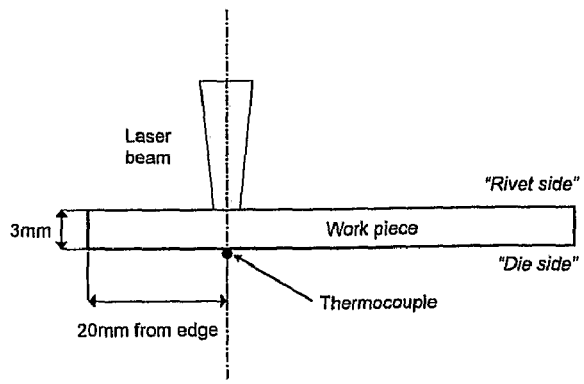
FIGS. 2A to 2D illustrate the effects of changing the laser power of a laser beam incident on an element, on the temperature of a 3 mm thick element of high pressure die cast AM50 alloy, over time, FIGS. 2A and B being in the case where the laser beam is directed onto the rivet side of the element and FIGS. 2C and 2D being in the case where the laser beam is directed onto the die side of the element.

According to preferred embodiments of the present invention, a method is provided for joining two or more elements together. In the method, the elements are positioned relative to another, usually with parts of the elements overlapping one another. At least a portion of at least one of the elements is enhanced in formability using the laser. Significantly, the laser enhances the formability of the portion of at least one of the elements by heating the portion without physically contacting the elements and can thus be spaced at a distance from the elements to effect this heating. Amongst other advantages, this enhances tool accessibility to the elements.

The elements may then be joined together which, in an embodiment of the present invention, occurs using a mechanical fastening method. This may be done repeatedly along a join line between the elements at discrete locations along the join line. The laser may preferably be used to enhance the formability of a plurality of portions of at least one of the elements at the discrete locations along the join line. The laser beam may be split to enhance the formability of several of these portions simultaneously or a number of lasers may be employed to enhance the formability of the several portions simultaneously or the plurality of portions may be enhanced one at a time by a single laser beam.

In another embodiment, a broad area of at least one of the elements is enhanced in formability using the laser, the broad area encompassing more than one discrete location at which the mechanical fastening method joins the elements together.

The method according to preferred embodiments of the present invention is particularly suitable for joining elements together which are of a material which is brittle or hard to press, form or join at room temperature. In particular, this method is applicable to metal including magnesium and magnesium alloys as well as high strength aluminium alloys, titanium and titanium alloys, steels and other metals and their alloys. The method is also particularly suitable for joining elements of dissimilar materials because the method involves plasticising and not melting of the elements. For the same reason, the method according to the preferred embodiments of the present invention is also particularly suitable for joining together elements of which at least one is a high pressure die cast metal. The metals may be hot or cold rolled, extruded, semi-finished or finished (eg. coated) prior to joining using the method.

The elements are not limited to any particular articles, but may be any articles that require joining. Although in particular applications the elements may be sheets of material, some or all of the elements may not be sheets of material, but may be studs, framework, bars or other structural members for example.

The mechanical fastening method is carried out approximate to the portion of at least one of the elements, preferably at the portion of at least one of the elements. The mechanical fastening method may be any suitable method, such as one using a mechanical fastener, or a clinching-type process, or a press-joining process.

The laser beam may be incident on either side of the element to enhance the formability of the portion of one of the elements as shown in FIGS. 1A and 1B (rivet side) as against FIGS. 1C and 1D (die side). Enhancing the formability of the portion may or may not occur prior to positioning the elements relative to one another. Portions of some or all of the elements may be enhanced by the laser beam or only a portion of one of the elements may be enhanced. If a portion of only one of the elements is to be enhanced in formability then the element so enhanced by the laser beam is preferably that which is of a material that is least formable at room temperature or the element which will be subjected to the greater strain during deformation of the elements to join them together using the mechanical fastening method.

The laser may be a pulsed or interrupted laser of suitable duration, energy and frequency, or may be a continuous laser, which produces a constant beam. The continuous laser may be converted into a pulsed or interrupted laser by any suitable mechanical, electrical or other-type apparatus. The size, shape and temperature distribution of the portion heated by the laser beam can be varied and hence optimised by varying one or more of the laser power, the laser spot size, the laser pulse length or frequency.

The size, shape and temperature distribution of the portion enhanced in formability by the laser beam can also be varied and hence optimised by varying the components of a laser optical apparatus which reflects the laser beam onto at least one of the elements. The laser optical apparatus may comprise various optic heads (such as an axicon focusing lens) and/or mirrors.

The shape of the portion of the at least one element which is enhanced in formability, and also of the laser beam may be a disc or a ring (anulus) shape. The shape of the laser beam may also be used to modify the temperature distribution at the surface of, and/or temperature gradient in the portion so that higher temperatures may be obtained where higher mechanical strains are to be applied.

The temperature of the at least one element can be varied by changing the laser power on the element, the size of the portion being enhanced (may be referred to as the "laser spot size") and laser dwell time (ie. the time taken to suitably enhance the formability of the element). This is shown in FIGS. 2A-2D where the temperature of a 3 mm thick high pressure die cast (HPDC) AM50 magnesium alloy was measured on the die side using a fine wire thermocouple spot welded on the surface. The laser was a 2.5 kW Nd:YAG laser.

The temperature of the element on the die side is more critical since more deformation is imparted to the element on the die side.

Figure 2B:
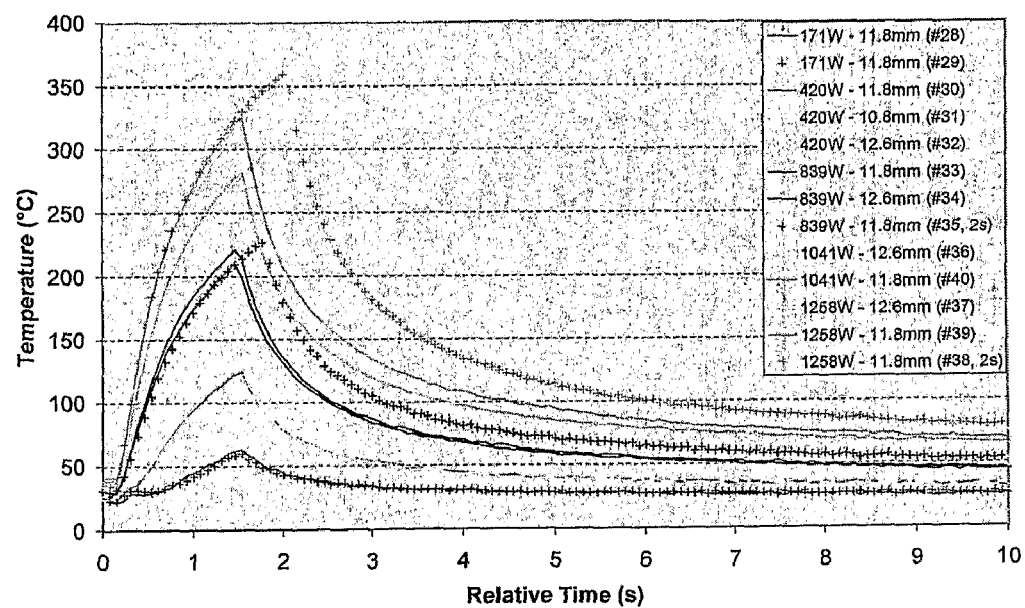

In FIGS. 2A and 2B, the laser beam is incident on the rivet side. To reach 250-300° C. on the die side, more power density and/or longer dwell times are required. The power density can be increased by increasing the laser power output and/or reducing the laser spot size (ie. the size of the portion being enhanced), but this would raise the temperature of the element on the laser irradiated side and may lead to incipient melting.

Figure 2C:
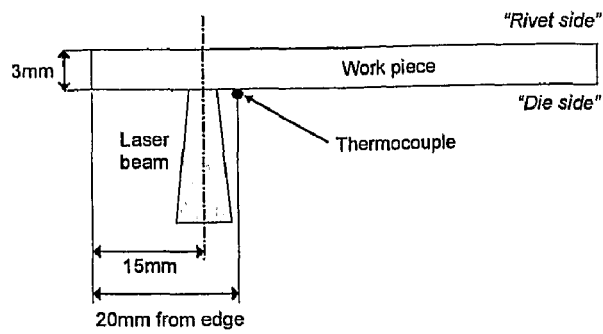
Figure 2D:
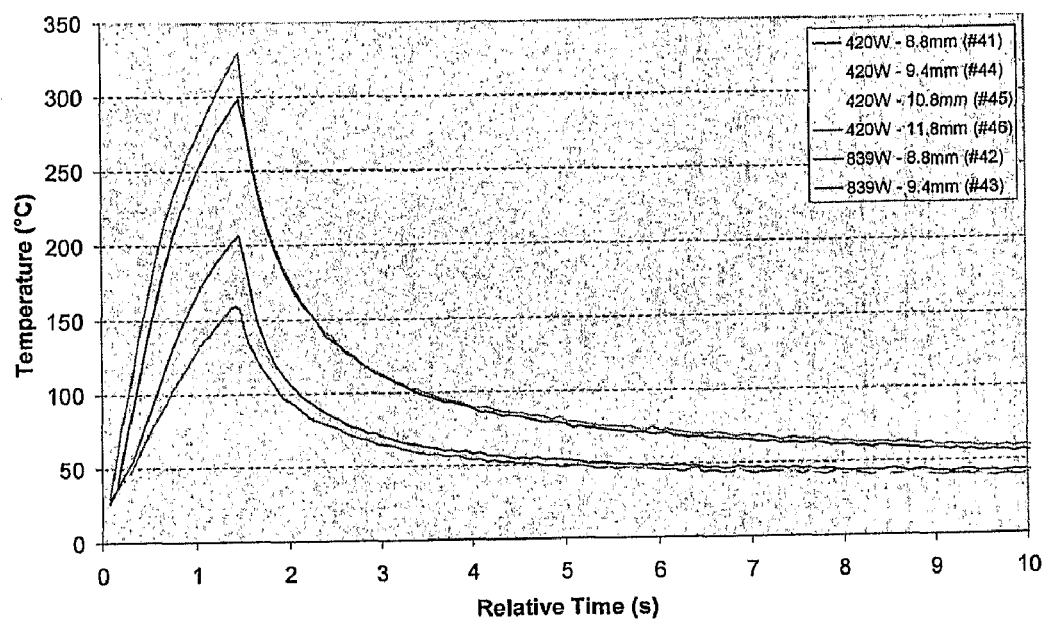

In FIGS. 2C and 2D, the laser beam is incident on the die side, so the power density and/or dwell times required to reach 250-300° C. are less than in FIGS. 2A and 2B and the risk of incipient melting is reduced.

Both FIGS. 2B and 2D show the heating and cooling temperature history of an element when the laser beam is turned ON for a preset dwell time and then turned OFF.

It is noted that the actual laser beam power at the surface of the element will be less than the laser power output due to system losses therebetween. The laser power output required and the time taken to suitably enhance the formability of the elements may be higher because of, amongst other factors, the number of elements being joined together, the total thickness of the elements, the alloy, the size of the elements and the distance of the portion from edge of the element. It is also noted that the laser may also need a power output of 5000 Watts or higher depending on the number of splits (if any) of the laser beam. In other words, the laser power output required is also dependent on the number of portions being enhanced in formability by the laser at the same time. The aforementioned power requirements can therefore generally be considered to be the power requirement per laser beam split or per portion being enhanced. Regardless, the power requirement is significantly lower to those of induction heating assisted SPR.

Furthermore, as demonstrated in FIGS. 2B and 2D, it is possible to heat the at least one element to 80% of its melting point (solidus). (where its formability is substantially enhanced) using the method according to preferred embodiments of the present invention, within 3.5 seconds. It is noted that this temperature for magnesium alloys (as used in relation to FIGS. 2B and 2D) may be between 100 to 350° C. depending on the alloy type and the uniformity of the element temperature as against the level and distribution of deformation required. Higher temperatures can accommodate higher strain or increased deformation, such as when using longer or harder rivets to produce thick joints which require more rivet interlock and higher strength (See FIG. 11). The steps of enhancing the formability and joining the elements using the mechanical fastening method can thus occur in less than 10 seconds, preferably less than 5 seconds as shown in FIG. 3A. This also provides a significant advantage over induction heating assisted SPR, where heating and joining take much longer. Furthermore, the method does not result in overheating or melting at the corners and edges of the element(s).

The heating temperature and the time taken to carry out the joining method may be optimised by measuring the surface temperature of the element(s) being heated and using the measured temperature to control the laser power output over time within a preset heating time, whilst avoiding any melting of the element. FIG. 2E provides an example time-dependent energy input such as this, which enables the desired temperature at which the formability of the element is suitably enhanced to be reached as quickly as possible to extend the dwelling time at this temperature and to optimise the temperature gradient in the portion for joining using the mechanical fastener.

As shown for example in FIGS. 1A to 1D, the laser beam may be directed onto the elements in axial alignment with a mechanical fastening tool which acts on the mechanical fasteners to join the elements together. In another embodiment, the laser beam may be non-axially arranged with respect to the mechanical tool. Preferably, the laser beam is coaxial with the mechanical tool so that the portion may be heated just before as well as during joining of the elements together. Furthermore, the co-axial arrangement of the laser beam with the mechanical fastening tool (including heating of the die) enables at least partial heating of the mechanical element and the tool prior to use so that heat losses from the elements to the mechanical fastener and tool during joining are minimised.

The laser may be a diode laser, a Nd:YAG laser or a CO2 laser or any other suitable laser.

The method may also comprise the step of preparing the surface of the portion of the element(s) upon which the laser beam is incident to enhance the absorption of the laser energy and hence increase the heating rate and/or reduce the power requirements by roughening (for example by using glass beads blasting) or by cleaning (for example by sand blasting or by pickling, rinsing and drying) or by applying a light absorptive coating. The absorptive coating may be a coating of graphite, black carbon, Aero 504 (Japan Acheson Corporation) or any other suitable absorber. The absorptive coating is applied by dabbing or spraying. The light absorptive coating may be a coating which also functions as a corrosion protective coating, such as e-coating.

The method may also comprise applying an adhesive material between at least two of the elements to be joined, prior to heating. Upon heating of the portion of at least one of the elements using the laser, the adhesive material is also heated, which cures and/or hardens the adhesive material. This provides an additional bond for the join between the elements.

The method may also comprise the step of clamping the elements together in their position relative to one another using a clamping tool. The step of clamping involves providing a substantial compressive force to the elements. The step of clamping may occur either prior to, simultaneously with, after or any combination thereof with the step of joining the elements together using a mechanical fastening method. Clamping the elements prior to the step of joining comprises using a hydraulic clamp to build up the compressive force on the elements. For clamping simultaneously with joining a spring clamp is used to build up the compressive force as the step of joining occurs. Clamping the elements prior to or simultaneously with the step of joining acts against the elements moving relative to one another during the step of joining. Clamping the elements after the step of joining, where the mechanical fastening method comprises using a mechanical fastener, acts to push the element material around the mechanical fastener, which improves the joint by increasing its fatigue strength.

The step of joining the elements together using a mechanical fastening method in a preferred embodiment of the present invention is a "self-piercing riveting" (SPR) process, in which a self-piercing rivet (which may be a solid or semi-hollow rivet) is acted upon by the mechanical fastening tool in the form of a rivet gun and die to drive the rivet into and/or through the portion of the elements which has been enhanced in formability by the laser, thereby deforming the elements. The portion which is enhanced may be on the rivet side of the elements, which is the side from which the rivet is driven into and/or through the elements, or on the die side of the elements, which is the opposing side to the rivet side. It is noted that the contact time between the elements and the mechanical fastening tool is less than 1.5 seconds (see FIG. 3A) and preferably less than 1.2 seconds. It is noted that FIG. 3A relates to joining of elements with a combined thickness of 4 to 5.3 mm.

In another embodiment, the mechanical fastener is a plastic rivet. The mechanical fastener may also be a bolt, screw, nut or stud for example.

In a further embodiment, the mechanical fastening method comprises deforming the part of the elements using a mechanical tool. Deforming the part of the elements with the mechanical tool forms the part of the elements into a mechanical fastener, typically in the form of an interlocking deformation of the elements.

The mechanical fastening method may be a clinching type process or a press-joining process, such as dieless clinching or dieless rivet clinching, where the mechanical tool is in the form of a punch and die.

Referring again to FIGS. 1A, 1B, 1C and 1D, alternative arrangements of an apparatus 10 for joining elements together according to an embodiment of the present invention, primarily for trial purposes are shown. The apparatus 10 comprises a mechanical fastening tool in the form of a rivet gun 11 and die 14 for acting on a mechanical fastener in the form of a self-piercing rivet (not shown) to join the elements together. The rivet gun 11 is mounted on a C-Frame 12. The apparatus 10 also comprises a laser beam generating device 13 for providing laser beam energy incident on at least a portion of at least one of the elements. As shown in FIGS. 1A to 1D, the laser beam generating device 13 is spaced at a distance from the elements. Thus, the laser generating device 13 is able to enhance the formability of the portion without having to physically contact the portion by providing the laser beam energy incident on the portion from this distance away from the elements.

The rivet gun 11 and the laser beam generating device 13 are shown in FIGS. 1A, 1B, 1C and 1D in different arrangements relative to an element 15. In FIG. 1A, the laser beam generating device 13 provides a convergent laser beam incident on rivet side 18 of the element 15 (which is the side from which the rivet is driven into and/or through the element 15), whilst in FIG. 1B, the laser beam is parallel and incident on the rivet side 18. In FIG. 1C, the laser beam generating device 13 provides a convergent laser beam incident on the die side 17 of the element 15, whilst in FIG. 1D, the laser beam is parallel and incident on the die side 17.

In addition, in FIG. 1D, the laser beam generating device 13 provides a laser beam which is co-axial with the rivet gun 11 and the die 14 (not shown in FIG. 1D), whereas in FIGS. 1A, 1B and 1C, the laser beam is arranged non-axially with respect to the rivet gun 11 (and the die 14). If the laser beam generating device 13 was arranged so that it provided a laser beam that was co-axial with the rivet gun 11 and incident on the rivet side 17 of the element, then this would enable at least partial heating of the rivet or the rivet gun 11 prior to and/or during use so that heat losses from the element 15 to the rivet and the rivet gun 11 during joining are minimised. Similarly, co-axial alignment of the laser beam with the die 14 and incident on the die side 18 would enable at least partial heating of the die 14 prior to and/or during use to minimise heat losses.

The length of the rivet shank may be optimised relative to the combined thickness of the elements being joined together to produce crack free joints of maximum strength. The rivet shank length should be greater than the combined thickness of the elements being joined together to account for the flaring of the rivet shank during joining whilst still enabling the rivet to pierce all elements sufficiently. The length of the rivet shank is also dependent on the diameter of the rivet. For example, for a 5 mm diameter rivet an optimal shank length is one which is 2 to 4 mm greater than the combined thickness of the elements being joined.

The strength of the joint may be improved by using a harder rivet. This is because any failure of the joint is likely to occur in the elements being joined and not the rivet. Thus, the rivet strengthens the joined elements. FIG. 8A illustrates the improvement in strength in the join between two 3 mm AM50 elements when using longer and harder rivets.

However, when using harder rivets, the rivet shank is less inclined to flare during the joining process, which may result in undesirable cracks forming in the joined elements.

In order to overcome this problem, the die 14 may be of a shape other than a flat plate or flat indentation die which encourages the rivet shank and the elements being joined to flow during joining away from the centre of the die such that the rivet shank flares appropriately and the elements being joined undergo lower major strains and are thus less likely to crack (see FIG. 8b). A particularly suitable shape die is a "cone" shaped die (shown in FIG. 4) which has a raised central portion. The raised central portion may be curved or straight edged (ie. triangular). The exact shape of the die (for both flat and cone dies) may be optimised for various conditions by adjusting the die diameter (D), die depth (d), chamfer ($\alpha$), radii of curvature (R1, R2, R3) or tip height (t) as shown in FIG. 4. Another suitably shaped die is a semi-toroidal shaped die. The conditions for which the die shape may be optimised include the rivet length, the rivet hardness, the combined thickness of the elements being joined, the material from which the elements are formed and the required strength of the joint. FIG. 8A also shows the improvement in joint strength when using the cone-shaped die over the flat indentation die for the longer and harder rivets.

The die 14 may be provided with a coating which is non-stick, and/or heat resistant and/or oxidation resistant in order to extend the operational life of the die 14 and control the friction between the die 14 and the lower-most element being joined.

EXAMPLES

To demonstrate embodiments of the invention, a number of different pairs of elements were joined under different conditions using a laser to enhance the formability of a portion of at least one of the elements and a self piercing rivet as the mechanical fastener.

Examples are given where a 2.5 kW Nd:YAG laser was used in conjunction with a self-piercing riveting (SPR) apparatus. The SPR apparatus was a 2-stage hydraulic rivet setter comprising one double acting hydraulic cylinder and one pre-clamping hydraulic cylinder.

For laboratory trial purposes, the laser beam was incident on the element on the die side, as shown schematically in FIG. 1C, and inclined at about 45°. The beam focussing lens was positioned to produce a constant laser spot size on the element of 11±0.8 mm which approximated the inner diameters of the dies used for SPR joining.

Constant energy input profiles such as depicted in FIG. 2E were delivered to the work piece (element). The level of energy input or laser power, and laser dwell times were the main process parameters.

The application of the laser beam was effected by a mechanical process shutter. The voltage signal from the laser process shutter was recorded. The clamping and rivet setting pressures during joining were also monitored. The surface temperature of the laser irradiated side of the element was monitored using an infra-red (IR) thermal imaging camera.

Elements of various thicknesses and alloys were joined. Examples given below are for the laser assisted SPR joining of magnesium-to-magnesium (Mg/Mg), and aluminium-to-magnesium (Al/Mg). The labelling convention cites the element on the rivet side-to-the element on the die side.

Materials used included: 2 to 3 mm thick high pressure die cast (HPDC) AM50 and AM60 magnesium alloys, 3.3 mm thick strip cast AZ31-O magnesium alloy, 2 mm thick Al 5005-H34 aluminium alloy sheet, and 1.5 or 3 mm thick Al6060-T5 aluminium alloy extruded plate.

Hollow steel rivets with 5 mm diameter stems and various stem lengths and hardness levels were used. It is noted that an 8 L3 rivet is one which is 8 mm long and has a hardness which is designated L3. Rivets of the hardness L2, L3 and L4 were used with an L3 rivet being harder than an L2 rivet and an L4 rivet being harder than an L3 rivet.

A number of differently shaped dies were used in the testing, with either a "cone" die profile, as shown schematically in FIG. 4, or a "flat" die profile.

Example 1

To produce crack-free joints, the laser power and dwell time were varied to locally preheat the magnesium alloy element on the die side to a temperature which suitably enhances its formability. The laser power outputs were thus determined experimentally for preset heating times of up to 3.6 s and for various combinations of elements as shown in FIG. 3A. The external and internal appearance of the corresponding joints is shown in FIGS. 3B to 3E.

Example 2

FIG. 5A shows a typical laser preheating and SPR cycle to join two thick elements. The temperature curve shows a decrease in temperature after the shutter is closed; the subsequent spike in temperature is due to the SPR tool coming into the measuring field of view of the infra-red camera. The IR temperature data after the start of SPR is therefore not indicative of the element temperature during joining, but provides information on the various stages of the SPR process that is consistent with the pressure data for clamping and rivet setting.

The total duration of the clamping and rivet setting stages of the SPR process was thus determined to average 1.47±0.03 s in several trials of laser assisted SPR and was reduced to 1.29±0.07 s in a subsequent trial by reducing the time delay between the start of clamping and start of rivet setting. This was achieved by changing one setting parameter of the programmable logic controller of the SPR apparatus. In effect, this resulted in reducing the contact time between the elements and the mechanical SPR tools, therefore reducing heat losses. Heat losses are also due to heat diffusing away from the laser irradiated portion and into the rest of the elements. The laser power and dwell times used to compensate for the heat losses and produce crack-free joints are shown in FIGS. 5B and 5C respectively. As a result, the surface temperature of the element heated by the laser was raised up to 80% of the melting point of the element, which prevented melting and compensated for heat losses by contact to the SPR tools during clamping, so that the element temperature during rivet setting fell within a temperature range where its formability was suitably enhanced. This is summarised in Table 1. The total time taken to complete the joining method (excluding positioning of elements relative to one another) was determined to be less than 5 s (for the subsequent trials), as shown in FIG. 6.

| Elements | Die | Rivet | No. of test pieces | Testing speed (mm/min) | | Preset laser power (W) | Power on element (W) | Preset dwell time (s) | Cycle time (s) |
|---|---|---|---|---|---|---|---|---|---|
| 3 mm + 3 mm AM50 | BD2 | 8 mm L 3 | 6 | 100 | Avge | 1846± | 1553 | 3.09 | 4.39 |
| | | | | | Stdev | 29 | 40 | 0.20 | 0.20 |
| 3 mm + 3 mm AM50 | BD2 | 8 mm L 3 | 2 | 0.6 | Avge | 1846 | 1560 | 3.01 | 4.31 |
| | | | | | Stdev | 0 | 0 | 0.00 | 0.00 |
| 3 mm Al6060T5 + 3 mm AM50 | BD2 | 8 mm L 3 | 3 | 0.6 | Avge | 2080 | 1758 | 3.51 | 4.78 |
| | | | | | Stdev | 0 | 0 | 0.00 | 0.00 |

-continued

| | | | | | | | | | |
|---|---|---|---|---|---|---|---|---|---|
| 3 mm AI6060T5 + 3 mm AM50 | BD2 | 8 mm L 3 | 2 | 100 | Avge | 2080 | 1758 | 3.51 | 4.79 |
| | | | | | Stdev | 0 | 0 | 0.00 | 0.00 |
| 3.3 mm + 3.3 mm AZ31 | BD2 | 8 mm L 3 | 4 | 100 | Avge | 2080 | 1758 | 3.51 | 4.78 |
| | | | | | Stdev | 0 | 0 | 0.00 | 0.00 |
| 3.3 mm + 3.3 mm AZ31 | BD2 | 8 mm L 4 | 5 | 100 | Avge | 2080 | 1758 | 3.51 | 4.78 |
| | | | | | Stdev | 0 | 0 | 0.00 | 0.01 |
| 3 mm AI6060T5 + 3.3 mm AZ31 | BD2 | 8 mm L 3 | 5 | 100 | Avge | 2203 | 1861 | 3.51 | 4.78 |
| | | | | | Stdev | 46 | 39 | 0.00 | 0.00 |
| 3 mm AI6060T5 + 3.3 mm AZ31 | BD2 | 8 mm L 4 | 5 | 100 | Avge | 2182 | 1844 | 3.51 | 4.78 |
| | | | | | Stdev | 0 | 0 | 0.00 | 0.00 |
| 2.5 mm + 2.5 mm AM60 | BD4 cone die | φ 5 × 7 mm L 2 | 5 | 100 | Avge | 1617 | 1366 | 3.01 | 4.30 |
| | | | | | Stdev | 81 | 69 | 0.00 | 0.00 |
| 3 mm AI6060T5 + 2.5 mm AM60 | BD4 cone die | φ 5 × 7 mm L 2 | 3 | 100 | Avge | 1747 | 1476 | 3.01 | 4.29 |
| | | | | | Stdev | 63 | 53 | 0.00 | 0.00 |
| 3 mm AI6060T5 + 2.5 mm AM60 | BD2 cone die | φ 5 × 8 mm L 3 | 3 | 100 | Avge | 1781 | 1505 | 3.51 | 4.78 |
| | | | | | Stdev | 84 | 71 | 0.00 | 0.01 |
| 2 mm + 2 mm AM60 | BD4 cone die | φ 5 × 6 mm L 2 | 2 (small) | 100 | Avge | 1184 | 1000 | 2.76 | 4.05 |
| | | | | | Stdev | 0 | 0 | 0.35 | 0.36 |
| 2 mm + 2 mm AM60 | BD5 flat die | φ 5 × 6 mm L 2 | 5 (small) | 100 | Avge | 1042 | 881 | 2.51 | 3.81 |
| | | | | | Stdev | 79 | 67 | 0.00 | 0.01 |
| 1.5 mm AI6060T5 + 2 mm AM60 | BD5 flat die | φ 5 × 6 mm L 2 | 6 (small) | 100 | Avge | 1054 | 891 | 2.72 | 4.02 |
| | | | | | Stdev | 29 | 25 | 0.25 | 0.25 |
| 3 mm + 3 mm AI6060T5 | Flat die | φ 5 × 8 mm L 4 | 3 | 100 | Avge | | | | |
| | | | | | Stdev | | | | |
| 3 mm + 3 mm AI6060T5 | Flat die | φ 5 × 8 mm L 4 | 2 | 0.6 | Avge | | | | |
| | | | | | Stdev | | | | |

| Elements | | Max Temp Rise | % Tm | Max loading (N) | Displacement at max loading (mm) | Loading at break (N) | Displacement at break (mm) |
|---|---|---|---|---|---|---|---|
| 3 mm + 3 mm AM50 | Avge | 333 | 60% | 6011 | 5.2 | 5109 | 6.0 |
| | Stdev | 103 | 18% | 247 | 0.6 | 292 | 0.5 |
| 3 mm + 3 mm AM50 | Avge | 313 | 56% | 6400 | 5.1 | 4674 | 6.0 |
| | Stdev | 3 | 0% | 48 | 0.2 | 422 | 0.1 |
| 3 mm AI6060T5 + 3 mm AM50 | Avge | 372 | 67% | 7035 | 5.9 | 5692 | 6.3 |
| | Stdev | 46 | 8% | 118 | 0.1 | 177 | 0.3 |
| 3 mm AI6060T5 + 3 mm AM50 | Avge | 424 | 76% | 6983 | 5.6 | 6028 | 6.0 |
| | Stdev | 2 | 0% | 550 | 0.2 | 172 | 0.1 |
| 3.3 mm + 3.3 mm AZ31 | Avge | 341 | 56% | 6536 | 5.9 | 5317 | 6.6 |
| | Stdev | 8 | 1% | 140 | 0.4 | 340 | 0.3 |
| 3.3 mm + 3.3 mm AZ31 | Avge | 388 | 64% | 5799 | 5.5 | 4671 | 6.6 |
| | Stdev | 19 | 3% | 144 | 0.2 | 424 | 0.3 |
| 3 mm AI6060T5 + 3.3 mm AZ31 | Avge | 351 | 58% | 7192 | 6.1 | 6390 | 6.9 |
| | Stdev | 12 | 2% | 187 | 0.4 | 116 | 0.5 |

-continued

| Sample | Stat | | | | | |
|---|---|---|---|---|---|---|---|
| 3 mm Al6060T5 + 3.3 mm AZ31 | Avge | 444 | 73% | 6532 | 5.1 | 5976 | 6.3 |
| | Stdev | 54 | 9% | 286 | 0.5 | 302 | 0.8 |
| 2.5 mm + 2.5 mm AM60 | Avge | 349 | 64% | 4573 | 3.7 | 4238 | 4.2 |
| | Stdev | 42 | 8% | 263 | 0.3 | 261 | 0.3 |
| 3 mm Al6060T5 + 2.5 mm AM60 | Avge | 327 | 60% | 4747 | 3.4 | 4732 | 3.4 |
| | Stdev | 23 | 4% | 294 | 0.2 | 290 | 0.2 |
| 3 mm Al6060T5 + 2.5 mm AM60 | Avge | 392 | 72% | 6118 | 4.6 | 5832 | 4.8 |
| | Stdev | 88 | 16% | 225 | 0.3 | 159 | 0.4 |
| 2 mm + 2 mm | Avge | 332 | 61% | 3565 | 6.1 | 2566 | 7.5 |
| | Stdev | 32 | 6% | 48 | 1.1 | 126 | 0.7 |
| 2 mm + 2 mm AM60 | Avge | 307 | 56% | 3379 | 5.6 | 3006 | 6.6 |
| | Stdev | 36 | 7% | 152 | 0.3 | 332 | 0.5 |
| 1.5 mm Al6060T5 + 2 mm AM60 | Avge | 331 | 61% | 3126 | 5.5 | 2715 | 6.3 |
| | Stdev | 59 | 11% | 204 | 0.7 | 181 | 1.0 |
| 3 mm + 3 mm Al6060T5 | Avge | | | 7447 | 6.4 | 4698 | 8.2 |
| | Stdev | | | 355 | 0.6 | 193 | 0.8 |
| 3 mm + 3 mm Al6060T5 | Avge | | | 7298 | 6.6 | 2919 | 10.0 |
| | Stdev | | | 317 | 0.5 | 127 | 0.4 |

Table 1 above shows that the surface temperature of the element heated by the laser was raised up to 80% of the melting point of the element, which prevented melting and compensated for heat losses by contact to the SPR tools during clamping, so that the element temperature during rivet setting fell within a temperature range where its formability was suitably enhanced. The temperature range for SPR forming may be 100-350° C. for a Mg element depending on the alloy, deformation speed (strain rate), and level and distribution of strain imparted. The latter depends on the die and rivet used, as well as the elements thickness.

FIG. 7A shows the temperatures and corresponding surface appearance of 3 mm+3 mm HPDC AM50 joints produced with 8 mm-L3 rivets and BD2 cone die profile Ø 11 mm×1.2 mm depth. With insufficient heating, heat losses to the SPR tools can become significant, and joining of the elements occurs in a forming temperature range where ductility is a problem. Cracking due to low ductility can be overcome by raising the element temperature, as shown by samples #11 and 12 in FIG. 7A. With overheating or incipient melting (e.g. due to too high power, too long laser dwell time or increased absorption of the laser radiation), joining of the element occurs in a hot working temperature range where hot shortness becomes a problem, as shown by samples #8 and 9 in FIG. 7, for which the peak surface temperature was out of the measuring range of the infra-red camera. In a conventional isothermal hot working regime, the temperature usually does not exceed 50 to 60% of the alloy melting point.

Figure 8C:
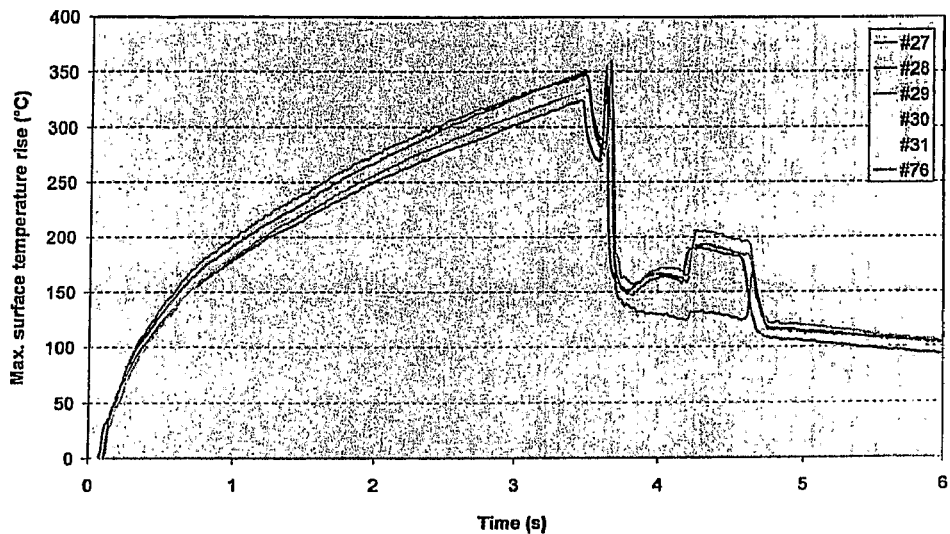
Figure 8D:
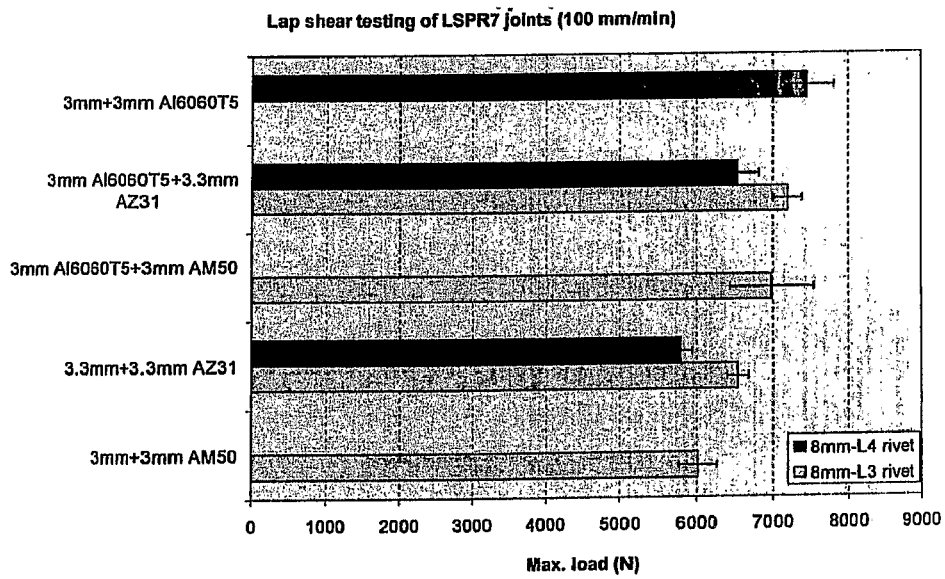

Peak surface temperatures up to 80% solidus are possible (see Table 1) because the time at temperature is brief and joining takes less than 1.3 s. Higher temperatures can accommodate higher strain or increased deformation, such as when using longer or harder rivets to produce thick joints with more rivet interlock and higher strength, as shown in FIG. 7D provided the right die profile is used, as shown in FIGS. 8A and 8B. Thus, with the appropriate selection and control of laser assisted joining parameters, reproducible temperature histories can be achieved, as illustrated in FIG. 8C, to yield good joins with adequate strength (see FIG. 10C the strength of joins related to FIG. 8C).

Example 3

Figure 9:
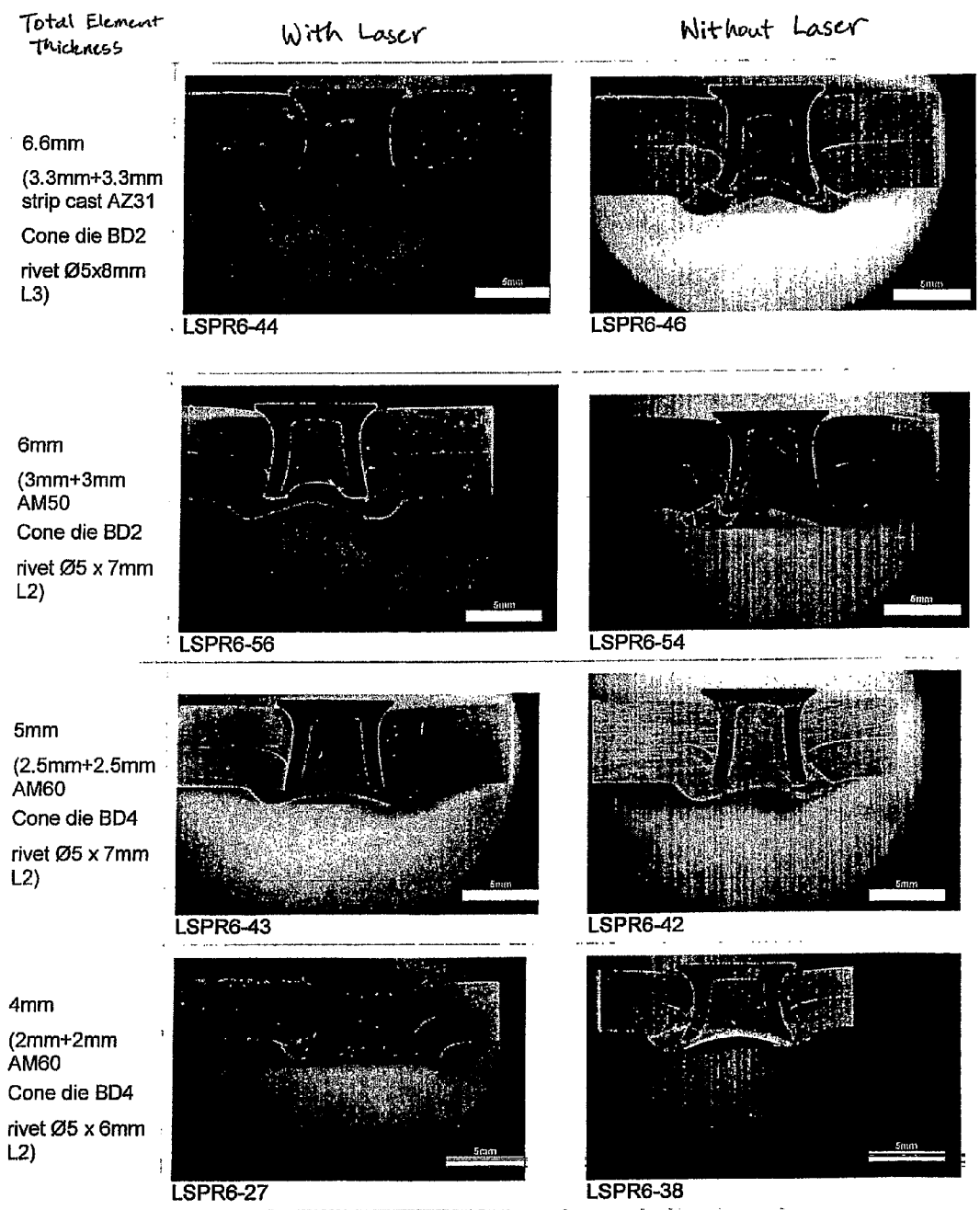
FIG. 9 is a series of comparative images of elements joined together with and without the use of a laser to enhance the formability of a portion of at least one of the elements.

A number of different pairs of elements were joined under different conditions with and without the use of a laser to enhance the formability of a portion of at least one of the elements to assess the effect thereof. Images comparing the joints formed with and without the use of the laser are shown in FIG. 9. The joints were produced using rivets with longer and/or harder stems than those shown in FIGS 3B to 3E of Example 1. It is noted that not only is cracking of the bottom element prevented when the laser is used to enhance the formability, but there is also better contact of the rivet head with the surrounding material when the laser is used.

In FIG. 10, some static lap shear test data are given for single point joints of different combinations of elements produced with various rivets and dies. FIG. 10 shows that laser assisted SPR joints can be produced to meet a variety of strength requirements.

In the claims which follow and in the preceding description of the invention, except where the context requires otherwise due to express language or necessary implication, the word "comprise" or variations such as "comprises" or "comprising" is used in an inclusive sense, ie. to specify the presence of the stated features but not to preclude the presence or addition of further features in various embodiments of the invention.

It is to be clearly understood that although prior art publication(s) are referred to herein, this reference does not constitute an admission that any of these documents forms part of the common general knowledge in the art in Australia or in any other country.

The invention claimed is:

1. A method for joining elements together after enhancing the formability of said elements, the method comprising the steps of:
   positioning the elements relative to one another;
   enhancing the formability of at least a portion of at least one of the elements by using the energy of a laser beam to heat the portion of the element to below its melting point; and
   joining the elements together using a mechanical fastening method in which a mechanical fastener is driven into the elements from one side of the elements, wherein the laser beam is incident to either side of the elements.

2. A method as claimed in claim 1, wherein the time taken to suitably enhance the formability of the element is less than 3.5 seconds.

3. A method as claimed in claim 1, wherein the time taken to suitably enhance the formability and join the elements together using the mechanical fastening method is less than 10 seconds.

4. A method as claimed in claim 1, wherein the formability of the element is suitably enhanced by raising the temperature of the portion up to 80% of the melting point (solidus) of the element.

5. A method as claimed in claim 1, wherein the method also comprises the step of preparing the surface of the portion of the element(s) to enhance the absorption of the laser energy, the step of preparing the surface comprising any one of more of roughening the surface, cleaning the surface, and applying a light absorptive coating to the surface.

6. A method as claimed in claim 1, wherein the method also comprises the step of applying an adhesive material between at least two of the elements to be joined, prior to the step of enhancing the formability.

7. A method as claimed in claim 1, the method also comprising the step of clamping the elements in their position relative to one another.

8. A method as claimed in claim 7, wherein the step of clamping occurs prior to the step of joining the elements together using the mechanical method.

9. A method as claimed in claim 7, wherein the step of clamping occurs simultaneously with the step of joining the elements together using the mechanical fastening method.

10. A method as claimed in claim 7, wherein the step of clamping occurs after the step of joining the elements together using the mechanical fastening method.

11. A method as claimed in any claim 1, wherein the mechanical fastener is a self-piercing rivet, bolt, nut, screw or stud.

12. A method as claimed in claim 1, wherein the step of joining the elements together is a self-piercing riveting process, in which the self-piercing rivet is acted upon by a mechanical fastening tool to rive the rivet into and/or through the elements.

13. A method as claimed in claim 12, wherein the mechanical tool also comprises a die and the method comprises the step of heating the die using the laser.

14. A method as claimed in claim 1, wherein the method further comprises the step of heating the mechanical fastener prior to the step of joining the elements together.

15. A method as claimed in claim 14, wherein the mechanical fastener is heated using the laser.

16. A method as claimed in claim 1, wherein the method further comprises repeating the step of joining the elements together at a plurality of discrete locations along a join line, and repeating the step of enhancing the formability of a plurality of discrete portions of at least one of the elements.

17. A method as claimed in claim 16, wherein the method further comprises simultaneously enhancing the formability of some or all of the plurality of portions.

18. A method as claimed in claim 16, wherein the method further comprises splitting a single laser beam to enhance the formability of a plurality of portions of at least one of the elements.

19. A method as claimed in claim 18, wherein the laser power output is 100-5000 Watts per laser beam split.

20. A method as claimed in claim 1, wherein the laser beam is incident on the side opposite to the side from which the mechanical fastener is driven into the elements.

21. A method as claimed in claim 1, wherein the elements are formed of metal.

22. A method as claimed in claim 21, wherein the metal is selected from the group consisting of magnesium, magnesium alloys, aluminum, aluminum alloys, titanium, titanium alloys and steels.

23. A method as claimed in claim 1, wherein each element comprises a dissimilar metal to the other element(s) being joined.

24. A method as claimed in claim 1, wherein the elements are in a form selected from the group consisting of sheets, studs, framework, bars and other structural members.

25. A method as claimed in claim 1, wherein the mechanical fastener is driven into the portion that the laser is incident on.

26. A method as claimed in claim 1, wherein the laser beam has a spot size incident on the elements of 10.2-11.8 mm in diameter.

27. A method as claimed in claim 1, wherein the method comprises after enhancing the formability of the portion of the elements and prior to carrying out the joining step, stopping the laser beam from being incident on the portion of the elements.

28. A method as claimed in claim 1, wherein enhancing the formability of the elements comprises enhancing any one or more of the physical properties of the elements selected from the group consisting of ductility, workability, plasticity, flow (hardening) behavior, yield surface or anisotropy.

29. An apparatus for joining elements together, the apparatus comprising a laser beam generating device for providing a laser beam incident on either side of at least a portion of at least one of the elements to heat the portion of the elements to below its melting point, and a mechanical fastening tool for acting on a mechanical fastener to join the elements together by driving the mechanical fastener into the elements from one side of the elements.

30. An apparatus as claimed in claim 29, wherein the mechanical fastening tool comprises a rivet gun for acting on a mechanical fastener.

31. An apparatus as claimed in claim 29 wherein the mechanical fastening tool also comprises a die.

32. An apparatus as claimed in claim 31, wherein the die comprises an indentation which is flat in profile.

33. An apparatus as claimed in claim 31, wherein the die comprises an indentation which is shaped to encourage flow of the elements being joined away from the centre of the die.

34. An apparatus as claimed in claim 29, the apparatus also comprising a clamping tool for clamping the elements in their position relative to one another.

35. A method of manufacturing a join between two elements after enhancing the formability of said elements, the method comprising the steps of:

positioning the elements relative to one another;

enhancing the formability of at least a portion of at least one of the elements by using the energy of a laser beam to heat the portion of the element to below its melting point; and forming the join between the elements by driving a mechanical fastener into the elements from one side of the elements, wherein the laser beam is incident to either side of the elements.

\* \* \* \* \*

UNITED STATES PATENT AND TRADEMARK OFFICE
CERTIFICATE OF CORRECTION

| | | |
|---|---|---|
| PATENT NO. | : 8,234,770 B2 | Page 1 of 1 |
| APPLICATION NO. | : 12/302702 | |
| DATED | : August 7, 2012 | |
| INVENTOR(S) | : Yvonne Claire Durandet et al. | |

It is certified that error appears in the above-identified patent and that said Letters Patent is hereby corrected as shown below:

Title Page
Item (75), Line 6,
Change "Closebum (AU)" to -- Closeburn (AU) --.

Column 17
Line 64,
Change "7D" to -- 7B --.

Column 19
Line 53,
(Claim 11, Line 1)
Delete "any".

Column 19
Line 59,
(Claim 12, Line 4)
Change "rive" to -- drive --.

Signed and Sealed this
Fifteenth Day of January, 2013

David J. Kappos
*Director of the United States Patent and Trademark Office*